US012119006B2

(12) United States Patent
Singhal et al.

(10) Patent No.: US 12,119,006 B2
(45) Date of Patent: Oct. 15, 2024

(54) BIASING INTERPRETATIONS OF SPOKEN UTTERANCE(S) THAT ARE RECEIVED IN A VEHICULAR ENVIRONMENT

(71) Applicant: GOOGLE LLC, Mountain View, CA (US)

(72) Inventors: Amit Singhal, Sunnyvale, CA (US); Michael Ng, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 290 days.

(21) Appl. No.: 17/690,403

(22) Filed: Mar. 9, 2022

(65) Prior Publication Data

US 2023/0290358 A1 Sep. 14, 2023

(51) Int. Cl.
*G10L 17/22* (2013.01)
*G06F 16/33* (2019.01)
*G06F 16/332* (2019.01)
*G10L 17/14* (2013.01)

(52) U.S. Cl.
CPC .......... *G10L 17/22* (2013.01); *G06F 16/3329* (2019.01); *G06F 16/3344* (2019.01); *G10L 17/14* (2013.01)

(58) Field of Classification Search
CPC ......... G10L 17/22; G10L 17/14; G10L 15/22; G10L 15/1815; G10L 15/26; G10L 2015/223; G10L 2015/228; G06F 16/3329; G06F 16/3344; G06F 16/90332; G06F 17/00; G06F 3/167; G06F 40/20; G06F 40/30
See application file for complete search history.

(56) References Cited

U.S. PATENT DOCUMENTS

| | | | |
|---|---|---|---|
| 11,017,037 B2 | 5/2021 | Andreica et al. | |
| 2014/0136013 A1* | 5/2014 | Wolverton | G10L 15/22 701/1 |
| 2016/0035348 A1 | 2/2016 | Kleindienst | |

(Continued)

OTHER PUBLICATIONS

European Patent Office; International Search Report and Written Opinion issued in Application No. PCT/US2022/035733; 11 pages; dated Dec. 2, 2022.

(Continued)

*Primary Examiner* — Yogeshkumar Patel
(74) *Attorney, Agent, or Firm* — Gray Ice Higdon

(57) ABSTRACT

Implementations described herein relate to various techniques for biasing interpretations of spoken utterances that are received in a vehicular environment. For example, implementations can receive a spoken utterance that includes a query from a user of a vehicle and obtain a corresponding vehicle sensor data instance generated by vehicle sensor(s) of the vehicle. Some implementations can determine to execute a search over only a first corpus of data, but not a second corpus of data, to obtain a given response to the query based on various criteria, including at least the query, the corresponding vehicle sensor data instance, a corresponding timestamp associated with the corresponding vehicle sensor data instance, and/or a corresponding duration of time the user has been associated with the vehicle. Additional, or alternative, implementations can execute a search over both the first and second corpora of data, and obtain the given response based on the criteria.

16 Claims, 8 Drawing Sheets

(56) References Cited

U.S. PATENT DOCUMENTS

2019/0311713 A1\* 10/2019 Talwar .................... G06F 40/30
2022/0068271 A1\* 3/2022 Berg ....................... H04S 7/301

OTHER PUBLICATIONS

European Patent Office; Communication pursuant to Article 94(3) EPC issued in Application No. 22747532.4; 6 pages; dated Dec. 11, 2023.

\* cited by examiner

BIASING INTERPRETATIONS OF SPOKEN UTTERANCE(S) THAT ARE RECEIVED IN A VEHICULAR ENVIRONMENT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) directed to an automated assistant, which may in some cases be converted into text and then processed, and/or by providing textual (e.g., typed) natural language input directed to an automated assistant. These spoken utterances and/or typed inputs often include assistant commands directed to an automated assistant. An automated assistant generally responds to these assistant commands by providing responsive user interface output(s) (e.g., audible and/or visual user interface output), controlling smart device(s), and/or performing other action(s).

These automated assistants typically rely upon a pipeline of components in interpreting and responding to these spoken utterances and/or typed inputs. For example, an automatic speech recognition (ASR) engine can process audio data that correspond to a spoken utterance of a user to generate ASR output, such as a transcription (i.e., sequence of term(s) and/or other token(s)) of the spoken utterance. Further, a natural language understanding (NLU) engine can process the ASR output (or typed inputs) to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain responsive content to the spoken utterance.

In some cases, these automated assistants may be employed in particular environments. For instance, a given automated assistant may be associated with an in-vehicle computing device of a vehicle of a user. In this example, the given automated assistant can utilize the aforementioned pipeline of components in interpreting and responding to these spoken utterances and/or typed inputs. However, in some of these cases, the given automated assistant fails to consider that it is employed in a vehicular environment in interpreting and responding to these spoken utterances and/or typed inputs. As a result, some spoken utterances associated with operation of the vehicle may be misinterpreted, thereby resulting in incorrect action(s) being performed, incorrect responsive content being provided, etc. Further, the user may provide additional spoken utterances and/or additional typed inputs in an effort to cause the correct action(s) to be performed and/or the correct responsive content to be provided, thereby increasing a quantity of user input and wasting computational resources.

SUMMARY

Implementations described herein relate to various techniques for biasing interpretations of spoken utterances that are received in a vehicular environment. For example, implementations can receive a spoken utterance that includes a query from a user located in a vehicle of the user, and obtain a corresponding vehicle sensor data instance generated by vehicle sensor(s) of the vehicle. Some implementations can determine to execute a search over only a first corpus of data, but not a second corpus of data, to obtain a given response to the query based on at least the query and the corresponding vehicle sensor data instance. In these implementations, the search can be executed over the first corpus of data to identify one or more candidate responses, and a given candidate response, from among the one or more candidate responses, can be provided for presentation to the user responsive to the query. Other implementations can execute a search over both the first corpus of data and the second corpus of data to identify the one or more candidate responses, and a given candidate response, from among the one or more candidate responses, can be provided for presentation to the user responsive to the query. In these implementations, selecting the given candidate response can be biased towards any candidate responses obtained from the search over the first corpus of data based on the corresponding vehicle sensor data instance. Notably, the first corpus of data in these implementations can correspond to a user manual corpus of data that is specific to the vehicle and provided by an original equipment manufacturer (OEM) of the vehicle. Further, the second corpus of data in these implementations can correspond to any corpus of data that is not specific to the vehicle, such as a web-based corpus of data.

For instance, assume that a spoken utterance of "What's under pressure?" is received from the user of the vehicle while the user is located in the vehicle. Further assume that a tire pressure sensor data instance of tire pressure data is obtained from a tire pressure sensor of the vehicle that indicates a front passenger tire of the vehicle is low in air. In some instances, the tire pressure sensor data instance may cause lights of a dashboard of the vehicle to be illuminated and/or an alert to be provided for presentation to the user via a display of an in-vehicle computing device to make the user aware the front passenger tire of the vehicle is low in air. Accordingly, interpreting the spoken utterance provided by the user can be biased towards the user manual corpus of data that is specific to the vehicle. As a result, a given candidate response to the query of "Your tire pressure is at 28 psi, but it should be at 32 psi according to the user manual" can be selected to be provided for audible and/or visual presentation to the user responsive to the query. Notably, in this example, the given candidate response can be selected, over one or more other candidate responses, using various biasing criteria. Absent these various biasing criteria, not only may the user manual corpus of data that is specific to the vehicle be searched, but also one or more other corpora of data that are not specific to the vehicle may be searched.

In some implementations, this biasing determination can be made based on determining whether the spoken utterance that includes the query was received within a threshold duration of time that the corresponding vehicle sensor data instance is generated and/or as indicated by the corresponding timestamp associated with the corresponding vehicle sensor data instance. The threshold duration of time may include, for instance, a static duration of time (e.g., 30 seconds, 2 minutes, etc.) or a dynamic duration of time that is based on other factors. For example, further assume that the tire pressure sensor data instance causes the lights of the dashboard of the vehicle to be illuminated and/or the alert to be provided for presentation to the user as noted above. Further assume the spoken utterance is received within 15 seconds of the lights of the dashboard being illuminated and/or the alert being displayed. In this example, it may be determined that the spoken utterance includes a query that is associated with the light on the dashboard being illuminated and/or the alert being displayed. Accordingly, this enables the temporal relationship between the spoken utterance being provided and the corresponding vehicle sensor data instance to be utilized in biasing interpretations of the spoken utterance.

In additional or alternative implementations, this biasing determination can be made based on determining whether the spoken utterance that includes the query is related to corresponding vehicle sensor data instance. For example, again assume the corresponding vehicle sensor data instance corresponds to the tire pressure data instance that indicates the front passenger tire is low on air, the lights of the dashboard of the vehicle to be illuminated and/or the alert to be provided for presentation to the user as noted above, and that the spoken utterance of "What's under pressure?" is received. Audio data capturing the spoken utterance that includes the query can be processed using an automatic speech recognition (ASR) model to generate one or more recognized terms corresponding to the query. This enables the determination that the recognized terms "under pressure" relate to the front passenger tire being low on air (e.g., using soft word matching, semantic word matching, and/or other techniques) in view of the lights of the dashboard and/or the alert to be made. Accordingly, this enables the linguistic relationship between the spoken utterance being provided and the corresponding vehicle sensor data instance to additionally, or alternatively, be utilized in biasing interpretations of the spoken utterance.

In additional or alternative implementations, this biasing determination can be made based on determining whether the user that provided the spoken utterance has been associated with the vehicle for a threshold duration of time. The threshold duration of time may indicate, for instance, a time that the user has spent inside the vehicle, a quantity of miles that the user has driven the vehicle, a quantity of times that the user has started the vehicle, a quantity of times that a given corresponding vehicle sensor data instance generated by one or more of the sensors of the vehicle has been obtained, and/or other factors. For example, in processing the audio data capturing the spoken utterance that includes the query, speaker identification on the audio data can be performed to determine whether the user that provided the spoken utterance is a known user. The speaker identification can be performed using any known technique (e.g., text-dependent speaker identification, text-independent speaker identification, etc.) and using any known speaker identification model. Additional, or alternative, techniques can be utilized to determine whether the user that provided the spoken utterance is a known user, such as face identification based on processing vision data generated by vision sensor(s) of the computing device or an additional computing device, fingerprint identification based on processing fingerprint data generated by fingerprint sensor(s) of the computing device or an additional computing device, and/or any other technique.

Further, the identification information can be compared to identification information of a known user of the vehicle (e.g., an account associated with the vehicle or the automated assistant), and determine whether the user is a known user. In these implementations, if the user is a known user, but has not been associated with the vehicle for the threshold duration of time, then the interpretations of the spoken utterance can be biased towards the user manual corpus of data. Additionally, or alternatively, if the user is not a known user, then the interpretations of the spoken utterance can be biased towards the user manual corpus of data. However, in these implementations, if the user is a known user and has been associated with the vehicle for the threshold duration of time, then the interpretations of the spoken utterance may not be biased towards the user manual corpus of data since the user is likely already familiar with what caused the dashboard of the vehicle to be illuminated and/or the alert to be displayed (e.g., the front passenger tire being under pressure). Accordingly, this enables the duration of time that the user has been associated with the vehicle to additionally, or alternatively, be utilized in biasing interpretations of the spoken utterance.

In additional or alternative implementations, this biasing determination can be made based on determining whether the spoken utterance includes an explicit indication to only search the first corpus of data. For example, again assume the corresponding vehicle sensor data instance corresponds to the tire pressure data instance that indicates the front passenger tire is low on air, and assume the lights of the dashboard of the vehicle are illuminated and/or the alert is displayed as noted above. However, assume that the spoken utterance of "Check my user manual to see what's under pressure" is received (e.g., rather than just "What's under pressure"). In this example, the query included in the spoken utterance also includes an explicit indication to only search the first corpus of data as indicated by "my user manual". Accordingly, this enables the user to additionally, or alternatively, provide an explicit indication that can be utilized in biasing interpretations of the spoken utterance.

Although the above techniques are described as being implemented at an in-vehicle computing device of a vehicle, it should be understood that is for the sake of example and is not meant to be limiting. For example, techniques described herein can additionally or alternatively be implemented at a mobile computing device of a user of the vehicle. Moreover, techniques described herein can additionally or alternatively be implemented by a remote computing device (e.g., a remote server or cluster of remote servers). However, in various implementations, on-device processing by the in-vehicle computing device and/or the mobile computing device may be prioritized in an effort to reduce latency in responding to the query that is included in the spoken utterance.

Moreover, although the above techniques are described with respect to utilizing the corresponding vehicle sensor data instance in determining which of one or more corpora of data to search and/or in causing searches to be executed over the one or more identified corpora of data, it should also be understood that is for the sake of example and is not meant to be limiting. For example, techniques described herein may perform one or more of these searches without any utilization of the corresponding vehicle sensor data instance. For instance, some vehicles do not have an in-vehicle computing device capable of implementing the automated assistant described herein and/or do not have a controller area network (CAN) bus for obtaining the corresponding vehicle sensor data instances. Nonetheless, in these instances, the automated assistant being implemented at a mobile computing device of the user can utilize the same or similar techniques described herein to restrict the search space for queries that are associated with the vehicle of the user, thereby resulting in biasing of interpretations of the spoken utterance.

By using the techniques described herein, various technical advantages can be achieved. As one non-limiting example, techniques described herein enable a system to efficiently restrict a search space for identifying candidate response(s) to a query based on the query and/or corresponding vehicle sensor data instance(s) of vehicle sensor data generated by sensor(s) of a vehicle. For instance, techniques described herein enable a search to be executed based on the query and over a given corpus of data (e.g., a user manual corpus of data that is specific to the vehicle) to identify a given candidate response to the query, but not other corpora of data, based on various contextual signals and/or data, thereby resulting in biasing of interpretations of the spoken utterance. Also, for instance, techniques described herein enable a search to be executed over multiple corpora of data (e.g., a user manual corpus of data that is specific to the vehicle and at least one additional corpus of data that is not specific to the vehicle), but to bias selection of the given candidate response to the query towards those derived from a given corpus of data, thereby resulting in biasing of interpretations of the spoken utterance. As a result, consumption of computational resources in processing the spoken utterance to identify the given candidate response can be reduced.

The above description is provided as an overview of only some implementations disclosed herein. Those implementations, and other implementations, are described in additional detail herein.

DETAILED DESCRIPTION OF THE DRAWINGS

Figure 1:
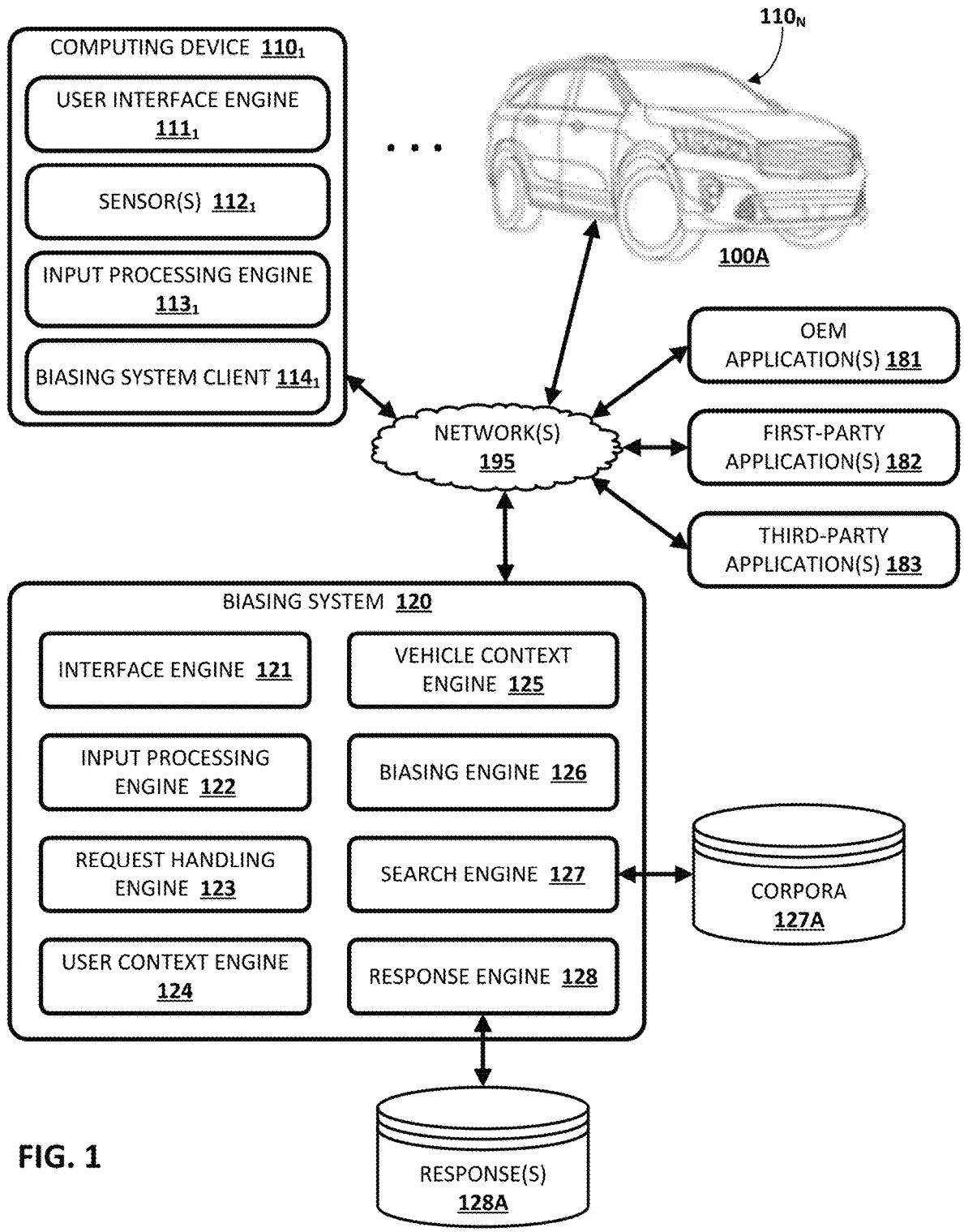
FIG. 1 depicts a block diagram of an example hardware and software environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, a biasing system 120 of an automated assistant application, a vehicle 100A, one or more original equipment manufacturer (OEM) applications 181, one or more first-party applications 182, and one or more third-party applications 183. Each of these components $110_{1-N}$, 120, 181, 182, and 183 may communicate, for example, through one or more networks indicated generally by 195. The one or more networks can include wired or wireless networks, such as local area networks (LANs) including Wi-Fi, Bluetooth, near-field communication, and/or other LANs, wide area networks (WANs) including the internet, and/or any other network to facilitate communication between the components depicted in FIG. 1.

In various implementations, a user may operate one or more of the computing devices $110_{1-N}$ to interact with other components depicted in FIG. 1. The computing devices $110_{1-N}$ may be, for example, a desktop computing device, a laptop computing device, a tablet computing device, a mobile phone computing device, an in-vehicle computing device of the vehicle 100A (e.g., an in-vehicle communications system, an in-vehicle entertainment system, and/or an in-vehicle navigation system as shown with respect to $110_N$), or a wearable apparatus that includes a computing device, such as a head-mounted display ("HMD") that provides an augmented reality ("AR") or virtual reality ("VR") immersive computing experience, a "smart" watch, and so forth. Additional and/or alternative computing devices may be provided.

Each of the computing devices $110_{1-N}$ and the biasing system 120 may include one or more memories for storage of data and software applications (e.g., one or more of the OEM applications 181, one or more of the first-party applications 182, and/or one or more of the third-party applications 183), one or more processors for accessing data and executing the software applications, and other components that facilitate communication over one or more of the networks 195. The operations performed by one or more of the computing devices $110_{1-N}$ and/or the biasing system 120 may be distributed across multiple computer systems. For example, the biasing system 120 may be implemented as, for example, computer programs running exclusively on or distributed across one or more computers in one or more locations that are communicatively coupled to each other over one or more of the networks 195.

One or more of the components $110_{1-N}$, 120, 181, 182, and 183 may include a variety of different components that may be used, for instance, to bias interpretations of spoken utterances that are received in a vehicular environment as described herein. For example, a computing device $110_1$ may include user interface engine $111_1$ to detect and process user input (e.g., spoken utterances, typed input, and/or touch input) directed to the computing device $110_1$. As another example, the computing device $110_1$ may include one or more sensors $112_1$ to generate corresponding sensor data. The one or more sensors can include, for example, global positioning system ("GPS") sensors to generate GPS data, vision components to generate vision data in a field of view of the vision components, microphones to generate audio data based on spoken utterances captured in an environment of the computing device $110_1$, and/or other sensors to generate corresponding sensor data.

As yet another example, the computing device $110_1$ may operate an input processing engine $113_1$ (e.g., which may be standalone or part of another application, such as part of an automated assistant application) to interpret various user inputs received at the computing device $110_1$. For example, the input processing engine $113_1$ can cause audio data that captures a spoken utterance and that is generated by microphone(s) of the client device $110_1$ to be processed using automatic speech recognition (ASR) model(s) (e.g., a recurrent neural network (RNN) model, a transformer model, and/or any other ML model capable of performing ASR) to generate ASR output. Further, the input processing engine $113_1$ can cause the ASR output (or typed input) to be processed using natural language understanding (NLU) model(s) (e.g., a long short-term memory (LSTM), gated recurrent unit (GRU), and/or any other type of RNN or other ML model capable of performing NLU) and/or grammar-based NLU rule(s) to generate NLU output. Moreover, the input processing engine $113_1$ can cause the NLU output to be processed using fulfillment model(s) and/or fulfillment rule(s) to obtain one or more candidate responses that are responsive to the user input, such as action(s) to be performed by the automated assistant based on the user input, content item(s) to be provided for presentation to the user based on the user input, etc. In implementations where textual content is to be audibly rendered responsive to the spoken utterance or typed input, the user interface engine $111_1$ can cause the textual content to be processed using text-to-speech model(s) to generate synthesized speech audio data that includes computer-generated synthesized speech capturing the content. The synthesized speech audio data can be audibly rendered for presentation to the user via speaker(s) of the computing device $110_1$. In implementations where visual content is to be visually rendered responsive to the spoken utterance or typed input, the user interface engine $111_1$ can cause the visual content to be to be visually rendered for presentation to the user via a display of the $110_1$.

In various implementations, the ASR output can include, for example, one or more speech hypotheses (e.g., term hypotheses and/or transcription hypotheses) that are predicted to correspond to the voice activity and/or the spoken utterance of the user captured in the audio data, one or more corresponding predicted values (e.g., probabilities, log likelihoods, and/or other values) for each of the one or more speech hypotheses, a plurality of phonemes that are predicted to correspond to the voice activity and/or the spoken utterance of the user captured in the audio data, and/or other ASR output. In some versions of those implementations, the input processing engine $113_1$ can cause one or more of speech hypotheses to be selected as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the input processing engine $113_1$ can cause a part of speech tagger (not depicted) that is configured to annotate terms with their grammatical roles to be employed. Additionally, or alternatively, the input processing engine $113_1$ can cause an entity tagger (not depicted) that is configured to annotate entity references in one or more segments of the recognized text to be employed. The entity references can include, for instance, references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. As described herein, the NLU output can be utilized in determining whether the spoken utterance includes one or more salient terms corresponding to the user manual corpus of data.

Additionally, or alternatively, the input processing engine $113_1$ can cause a coreference resolver (not depicted) that is configured to group, or "cluster," references to the same entity based on one or more contextual cues to be employed. As one non-limiting example, the coreference resolver may be utilized to resolve the term "that" to a particular light or indicator associated with operation of the vehicle 100A in the natural language input "what's that light?", based on a corresponding sensor data instance generated by vehicle sensor(s) that resulted in the particular light or indicator associated with operation of the vehicle 100A being generated. In some implementations, one or more components utilized by the input processing engine $113_1$ may rely on annotations from one or more other components utilized by the input processing engine $113_1$. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As yet another example, the computing device $110_1$ may operate a biasing system client 1141 (e.g., which may be standalone or part of another application, such as part of an automated assistant application) to interact with the biasing system 120. Further, an additional computing device $110_N$ may take the form of an in-vehicle computing device of the vehicle 100A. Although not depicted, the additional computing device $110_N$ may include the same or similar components as the computing device $110_1$. For example, the additional computing device $110_N$ may include respective instances of a user interface engine to detect and process user input, one or more sensors to generate corresponding vehicle sensor data instances of vehicle sensor data, an input processing engine, and/or a biasing system client to interact with the biasing system 120. In this example, the one or more sensors can include vehicle sensors, such as tire pressure sensors to generate tire pressure data for tires of the vehicle 100A, airflow sensors to generate airflow data for an air conditioning system of the vehicle 100A, vehicle speed sensors to generate vehicle speed data for the vehicle 100A, energy sensors to generate energy source data for an energy source of the vehicle 100A, transmission sensors to generate transmission data for a transmission of the vehicle 100A, and/or any other sensors that are integral to the vehicle 100A and/or the in-vehicle computing device $110_N$ of the vehicle 100A. Moreover, although only the computing device $110_1$ and the in-vehicle computing device $110_N$ are depicted in FIG. 1, it should be understood that is for the sake of example and additional or alternative computing devices may be provided.

In various implementations, the biasing system 120 may include interface engine 121, input processing engine 122, request handling engine 123, user context engine 124, vehicle context engine 125, biasing engine 126, search engine 127, and response engine 128 as shown in FIG. 1. In some implementations, one or more of the engines 121-128 of the biasing system 120 may be omitted. In some implementations, all or aspects of one or more of the engines 121-128 of the biasing system 120 may be combined. In some implementations, one or more of the engines 121-128 of the biasing system 120 may be implemented in a component that is executed, in part or exclusively, remotely from one or more of the computing devices $110_{1-N}$. In some implementations, one or more of the engines 121-128 of the biasing system 120, or any operative portion thereof, may be implemented in a component that is executed, in part or exclusively, locally by one or more of the computing devices $110_{1-N}$.

Figure 2:
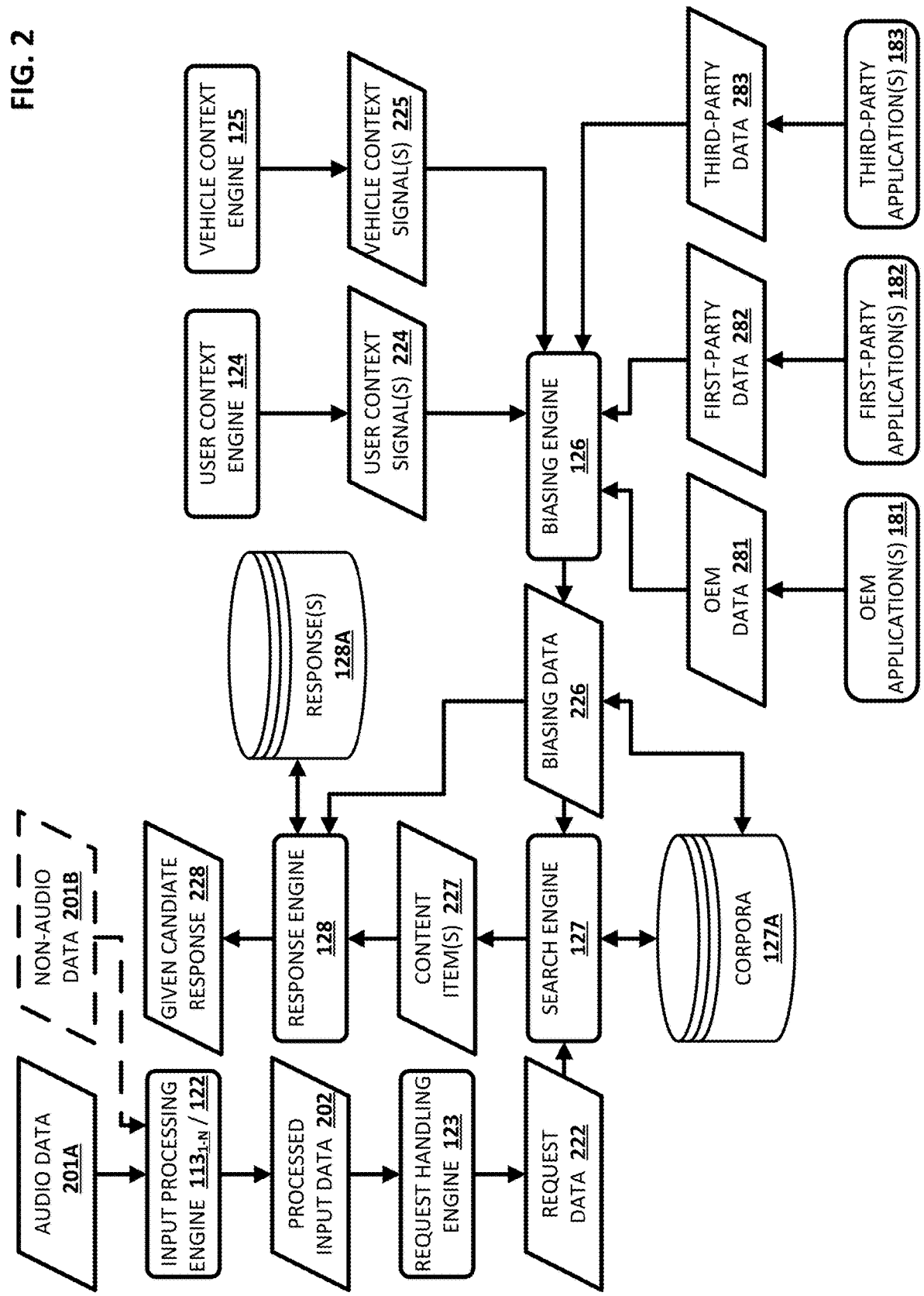
FIG. 2 depicts an example process flow of biasing interpretations of spoken utterance(s) that are received in a vehicular environment that demonstrates various aspects of FIG. 1, in accordance with various implementations.

Referring to FIG. 2, an example process flow of biasing interpretations of spoken utterance(s) that are received in a vehicular environment that demonstrates various aspects of FIG. 1 is depicted. The interface engine 121 (not depicted in FIG. 2) can facilitate the exchange of data to and/or from the one or more of the engines 121-128 depicted in FIGS. 1 and 2. For the sake of example, assume a spoken utterance is received from a user located in the vehicle 100A and via a computing device (e.g., the computing device $110_1$, the in-vehicle computing device $110_N$, and/or any other computing device). The spoken utterance can be captured in audio data 201A, and the input processing engine $113_{1-N}$/122 can process the audio data to generate processed input data 202. For example, the audio data can be processed using automatic speech recognition (ASR) model(s), natural language understanding (NLU) model(s), speaker identification model(s), and/or other models to generate the processed input 202. The processed input data 202 can include, for example, ASR data, NLU data, and/or any other data derived from processing the audio data 202. The request handling engine 122 can receive the processed input data 202, and determine that the spoken utterance includes a query based on analyzing the ASR data, NLU data, and/or any other data included in the processed input data. Further, the request handling engine 122 can generate request data 222 that can be utilized in causing one or more searches over one or more corpora of data to be performed as described herein. Moreover, the request handling can provide the request data to the search engine 127.

In various implementations, while the input processing engine $113_{1-N}$/122 and other components of the biasing system 120 are processing the audio data 201, the biasing engine 126 can process various signals and data obtained by the biasing system 120 to generate biasing data 226 to determine whether or not to restrict a search space for the query to one or more particular corpora of data. These various signals and data can include, for example, user context signal(s) 224 obtained via the user context engine 124, vehicle context signal(s) 225 obtained via the vehicle context engine 125, original equipment manufacturer (OEM) data 281 obtained via one or more OEM applications 181, first-party data 282 obtained via one or more first-party applications 182, third-party data 283 obtained via one or more third-party applications 183, and/or other various signals and data that may be utilized in determining whether to restrict the search space for the query to one or more particular corpora of data.

For instance, the user context signal(s) 224 obtained via the user context engine 124 can characterize a state of the user of the vehicle 100A. The state of the user of the vehicle 100A can include, for example, the user driving the vehicle 100A, the user being a passenger of the vehicle 100A, or an engagement level of the user while the vehicle 100A is moving. The state of the user of the vehicle 100A can additionally or alternatively include, for example, an origin location of the user, a destination location of the user, a route that the user is predicted to follow from the origin location to the destination location, and/or any other signals that characterizes the state of the user. Accordingly, it should be understood that the user context signal(s) 224 can be obtained based on data generated by the sensor(s) $112k$ of the computing device $110_1$, sensor(s) of the in-vehicle computing device $110_N$, sensor(s) of the vehicle 100A, and/or any other data, such as the first-party data 282 from the first-party application(s) 182 and/or the third-party data 283 from the third-party application(s) 183.

Also, for instance, the vehicle context signal(s) 225 obtained via the user context engine 125 can characterize a state of the vehicle 100A. The state of the vehicle 100A can include, for example, the vehicle 100A being powered to an "on" state, whether the vehicle 100A is moving, whether the vehicle 100A is stopped, whether the vehicle 100A is parked, whether the vehicle 100A is following a particular route, or whether the vehicle 100A includes additional occupants that are in addition to the user of the vehicle 100A. The state of the vehicle 100A can additionally or alternatively include, for example, information associated with operation of the vehicle 100A, such as how much of an energy source (e.g., gas, battery, etc.) is available to the vehicle 100A, whether any dashboard indicators are illuminated, and/or any other signals that characterize the state of the vehicle. Accordingly, it should be understood that the vehicle context signal(s) 225 can be obtained based on data generated by the sensor(s) of the in-vehicle computing device $110_N$, sensor(s) of the vehicle 100A, and/or any other data, such as the OEM data 281 from one or more of the OEM applications 181.

Moreover, the OEM data 281 can include any information that is accessible by an OEM application that is associated with the vehicle 100A and that is utilizable by the search engine 127 and/or the response engine 128 in obtaining a given candidate response 228 to the query included in the spoken utterance that was captured in the audio data 201. Similarly, the first-party data 282 and the third-party data 283 can include any information that is accessible by the first-party application(s) 182 and the third-party application(s) 183, respectively, and that is utilizable by the search engine 127 and/or the response engine 128 in obtaining the given candidate response 228 to the query included in the spoken utterance that was captured in the audio data 201, such as user account data, application usage information, and/or other data. As used herein, the term "first-party application" may refer to a software application that is developed and/or maintained by the same entity that develops and/or maintains the automated assistant and/or the biasing system 120 described herein. Further, as used herein, the term "third-party application" may refer to a software application or system that is developed and/or maintained by an entity that is different from the entity that develops and/or maintains the automated assistant and/or the biasing system 120 described herein.

The biasing engine 126 can process these various signals and data, and/or other signals and data, to determine whether or not to restrict a search space for the query to one or more particular corpora of data. Put another way, biasing engine 126 can process these various signals and data to determine whether one or more biasing criteria are satisfied. In response to determining one or more of the biasing criteria are satisfied, the biasing engine 126 can generate the biasing data 226 and provide the biasing data 226 to the search engine 127 to modify how the response(s) are obtained. For example, and as described in more detail below with respect to FIG. 3, the search engine 127 can restrict a search to be executed based on at least the query embodied in the request data 222 to a given corpus of data from among a plurality of corpora 127A. In this example, the search engine 127 may refrain from causing any searches over the other corpora of data from being executed. For instance, content item(s) 227 obtained responsive to causing the search to execute over the given corpus of data may include information identified from the given corpora of data. Also, for example, and as described in more detail below with respect to FIG. 4, the search engine 127 can cause multiple searches to be executed over the plurality of corpora 127A. Accordingly, the content item(s) 227 obtained responsive to causing the multiple searches to be executed over the plurality of corpora 127A may include information identified from each of the plurality of corpora 127A. However, in this example, the response engine 128 may subsequently bias selection of a given response to the query to be provided for presentation to the user towards the given corpus of data.

As described herein, the plurality of corpora 127A can include a first corpus of data and at least a second corpus of data that is in addition to the first corpus of data. The first corpus of data can correspond to, for example, a user manual corpus of data of a plurality of user manuals provided by an OEM of the vehicle 100A and/or other vehicles. In contrast, the at least second corpus of data can correspond to any other corpus of data. Notably, the first corpus of data can be defined or indexed with varying degrees of granularity. For example, the user manual corpus of data can be defined or indexed by OEMs, further defined or indexed by a year that the vehicles were manufactured by the OEM, further defined or indexed by a make of the vehicles manufactured by the OEM, further defined or indexed by a model of the vehicles manufactured by the OEM, further defined or indexed by a plurality of feature tags of features of vehicles manufactured by the OEM, and so on. The plurality of feature tags associated with any document within the first corpus of data can define various features of vehicles described within that document (e.g., documents describing power seats, documents describing heated seats, documents describing sports mode, etc.). Accordingly, when the spoken utterance is received from the user located in the vehicle 100A, the year, the make, the model, and/or the feature tags of the vehicle 100A can be transmitted to the biasing system 120 for use in searching at least the first corpus of data (e.g., as part of the request data 222 determined based on processing the spoken utterance and/or as part of the biasing data 226 determined based on the OEM data 281 received from the OEM application(s) 181). For example, when the user is located in vehicle 100A and provides a spoken utterance, the year, make, model, and a set of feature tags of the vehicle 100A can be provided to the biasing system 120, and used to restrict a search over the user manual corpus of data to relevant documents (e.g., documents that are associated with the year, make, and model of vehicle 100A, and whose feature tags are a subset of the feature tags associated with the vehicle 100A).

In various implementations, the first corpus of data may additionally, or alternatively, be associated with a plurality of salient terms that are present across the user manual corpus of data and that may be identified using various techniques (e.g., TF-IDF across the user manuals included in the user manual corpus of data and/or other techniques). These salient terms can be stored in association with various user manuals of the user manual corpus of data stored in the plurality of corpora 127A, and. For instance, a first user manual in the user manual corpus of data may include a first set of salient terms, a second user manual in the user manual corpus of data may include a second set of salient terms, and so on. Notably, some of these salient terms may overlap across the disparate user manuals included in the user manual corpus of data. In these implementations, the request data 222 can include an indication that one or more terms of the spoken utterance (e.g., determined based on the NLU output generated in processing the spoken utterance) matches one or more of the salient terms within the user manual corpus of data using various techniques (e.g., soft matching, etc.). In these implementations, the presence of the one or more terms of the spoken utterance that match one or more of the salient terms within the user manual corpus of data may be utilized as biasing criteria in biasing execution of a search over the first corpus of data and/or the second corpus of data. In some of these implementations, when the spoken utterance is received from the user located in the vehicle 100A, one or more terms of the spoken utterance that match one or more of the plurality of salient terms within the owner manual corpus of the vehicle 100A can be transmitted to the biasing system 120 for use in searching at least the first corpus of data (e.g., as part of the request data 222 determined based on processing the spoken utterance and/or as part of the biasing data 226 determined based on the OEM data 281 received from the OEM application(s) 181).

The response engine 128 can analyze the content item(s) 227 to identify the given candidate response 228 to be provided for presentation to the user responsive to the query that is included in the spoken utterance captured in the audio data 201. In some implementations, the response engine 128 can cause the content item(s) 227 to be augmented with other content stored in response(s) database 128A. For example, assume that a given content item corresponds to "tire pressure=32 psi". In this example, the automated assistant can infer based on the vehicle context signals(s) 225 that the current tire pressure of a front passenger tire is 28 psi. Assuming that the query included in the spoken utterance is related to the tire pressure and the asking inquiring with respect why a light associated with tire pressure was illuminated (e.g., biased towards a user manual corpus of data based on at least the vehicle context signal(s) 225), the response engine 128 can cause the given content item to be augmented to generate the given candidate response 228 of "Your tire pressure is at 28 psi, but it should be at 32 psi". Accordingly, the given candidate response 228 can be provided for audible and/or visual presentation to the user responsive to the query and using contextually relevant signals to bias interpretations of the spoken utterance.

Although the example of FIG. 2 is described with respect to the query being included in the spoken utterance that is captured in the audio data 201A, it should be understood that is for the sake of example and is not meant to be limiting. For example, the input processing engine $113_{1-N}/122$ can additionally, or alternatively, process non-audio data 2018 that captures the query. For example, the user can additionally, or alternatively, process the non-audio 201B, including textual data, touch data, and/or any other non-audio data, to identify the query that is included in the non-audio data 2018. Accordingly, even in instances when the user provides the query via the non-audio data, the biasing system 120 can use the same or similar techniques to cause the given candidate response to be identified and provided for presentation to the user of the vehicle.

Figure 3:
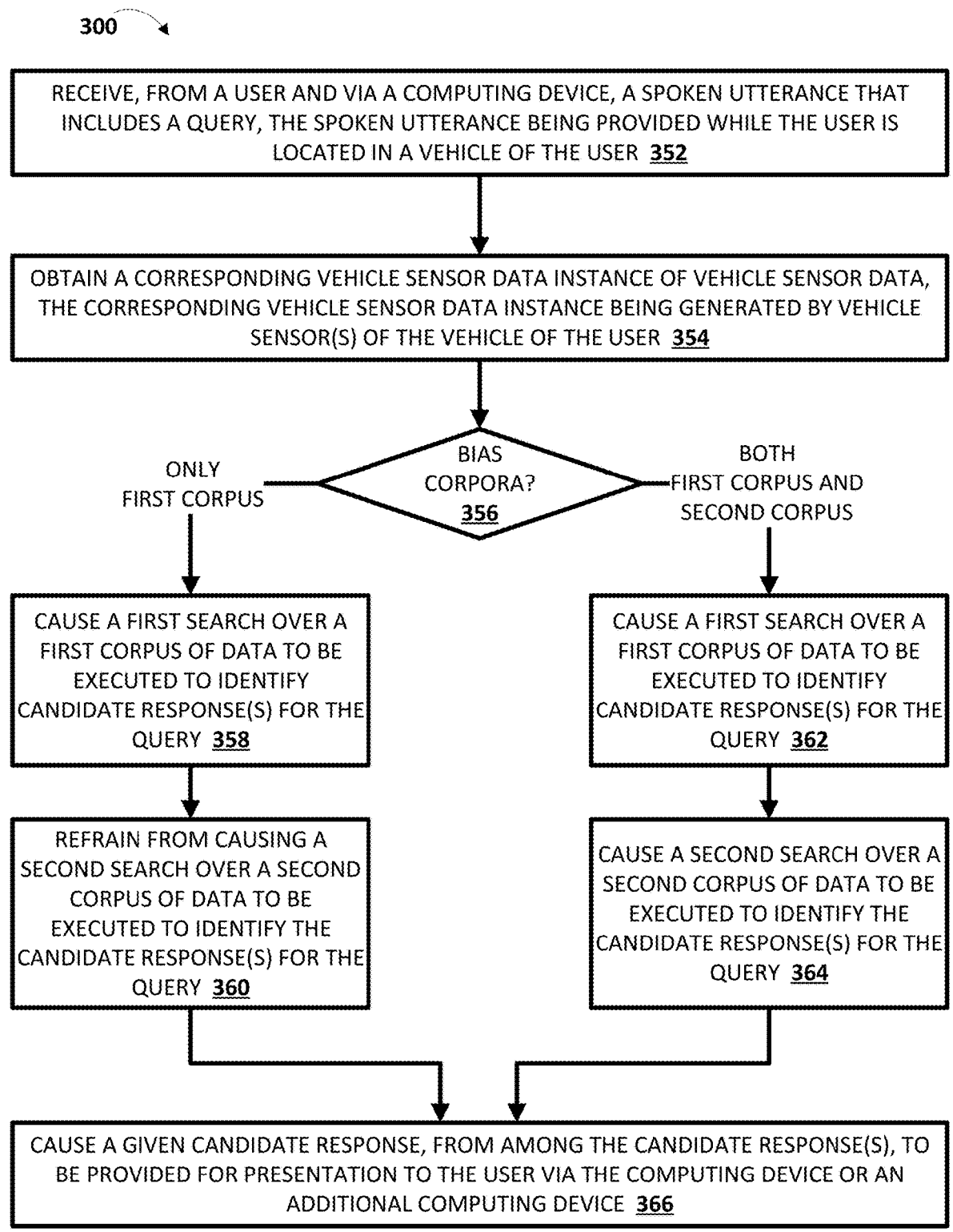
FIG. 3 depicts a flowchart illustrating an example method of biasing interpretations of spoken utterance(s) that are received in a vehicular environment, in accordance with various implementations.

Turning now to FIG. 3, a flowchart illustrating an example method 300 of biasing interpretations of spoken utterance(s) that are received in a vehicular environment is depicted. For convenience, the operations of the method 300 are described with reference to a system that performs the operations. This system of the method 300 includes at least one processor, at least one memory, and/or other component(s) of computing device(s) (e.g., computing device(s) $110_{1-N}$ of FIG. 1, biasing system 120 of FIG. 1, computing device 710 of FIG. 7, remote server(s), and/or other computing devices). While operations of the method 300 are shown in a particular order, this is not meant to be limiting. One or more operations may be reordered, omitted, and/or added.

At block 352, the system receives, from a user and via a computing device, a spoken utterance that includes a query, the spoken utterance being provided while the user is located in a vehicle of the user. The computing device can be, for example, an in-vehicle computing device of the vehicle or a mobile computing device of the user of the vehicle that is communicatively coupled to the vehicle and/or the in-vehicle computing device of the vehicle. In some implementations, the spoken utterance may be received in response to an automated assistant being explicitly invoked at the computing device via a particular word or phrase (e.g., "Assistant", "Hey Assistant", etc.), actuation of a hardware button or software button of the computing device, a particular gesture or combination of gestures (e.g., hand movement, eye movement, gaze, and/or any one of or combination thereof), and/or other techniques for explicitly invoking the automated assistant. In additional or alternative implementations, the spoken utterance may be received in response to the automated assistant being implicitly invoked at the computing device based on, for instance, one or more contextual signals associated with the user and/or the vehicle of the user.

For example, the spoken utterance that includes the query can be captured in audio data generated by one or more microphones of the computing device, and optionally in response to an invocation of the automated assistant as noted above. The system can process, using an automatic speech recognition (ASR) model, the audio data capturing the spoken utterance that includes the query to generate ASR data for the query, such as one or more recognized terms corresponding to the query. Further, the system can process, using a natural language understanding (NLU) model, the ASR data for the query, to generate NLU data for the query, such as intent(s), slot value(s) for parameter(s) associated with the intent(s), and/or other NLU data. Based on the NLU data for the query, the system can determine that the spoken utterance includes the query. Moreover, as described below, the system can utilize the NLU data in causing searches to be executed over one or more corpora of data.

At block 354, the system obtains a corresponding vehicle sensor data instance of vehicle sensor data, the corresponding vehicle sensor data instance being generated by one or more vehicle sensors of the vehicle of the user. The one or more vehicle sensors of the vehicle of the user can include, for instance, tire pressure sensor(s) of the vehicle that generate tire pressure data for tires of the vehicle, airflow sensor(s) of the vehicle that generate airflow data for an air conditioning system of the vehicle, vehicle speed sensor(s) of the vehicle that generate vehicle speed data for the vehicle, energy sensor(s) that generate energy source data for an energy source of the vehicle, transmission sensor(s) that generate transmission data for a transmission of the vehicle, and/or any other sensors that are integral to the vehicle and/or the in-vehicle computing device. Notably, each of these sensors can generate vehicle sensor data instances at a corresponding frequency that may be the same for one or more of the sensors of the vehicle and different for one or more other sensors of the vehicle. In some implementations, the corresponding vehicle sensor data instance can be associated with a corresponding timestamp that corresponds to a time that the corresponding vehicle sensor data instance is generated by one or more of the vehicle sensors and/or a time that the corresponding vehicle sensor data instance is obtained by the system. This time can be a global time with respect to a global clock (e.g., generated and/or obtained at 9:49 AM) or a relative time with respect to a relative clock (e.g., generated and/or obtained two minutes after the user entered the vehicle).

At block 356, the system determines, based on (i) the query and (ii) the corresponding vehicle sensor data instance, whether to execute a first search over a first corpus of data and/or a second search over a second corpus of data to identify one or more candidate responses for the query included in the spoken utterance. Put another way, the system can determine whether to bias a search space utilized to identify the one or more candidate responses by possibly restricting the search space based on the query and the corresponding vehicle sensor data instance. The first corpus of data can correspond to, for example, a user manual corpus of data that is specific to the vehicle and that is provided by an original equipment manufacturer (OEM) of the vehicle. Further, the second corpus of data can correspond to, for example, a corpus of data that is available to the system and that is not specific to the vehicle (e.g., not provided by the OEM of the vehicle), such as a web-based corpus of data, a knowledge graph, and/or any other corpus of data that is available to the system and that is not specific to the vehicle. Moreover, the system may make this determination based on one or more biasing criteria.

In some implementations, the system may make this determination based on determining whether the spoken utterance that includes the query was received within a threshold duration of time that the corresponding vehicle sensor data instance is generated and/or as indicated by the corresponding timestamp associated with the corresponding vehicle sensor data instance. The threshold duration of time may include, for instance, a static duration of time (e.g., 30 seconds, 2 minutes, etc.) or a dynamic duration of time that is based on other factors. For example, assume the corresponding vehicle sensor data instance corresponds to a tire pressure data instance that indicates a front passenger tire is low on air. As a result, an indication of the tire being low on air may be provided for presentation to the user, such as a light on a dashboard of the vehicle being illuminated and/or an alert being displayed at a display of the in-vehicle computing device of the vehicle. Further assume that within 15 seconds of the light on the dashboard being illuminated and/or the alert being displayed, that a spoken utterance of "What's under pressure?" is received by the system. In this example, the system may determine that the spoken utterance includes a query that is associated with the light on the dashboard being illuminated and/or the alert being displayed. Accordingly, the system may restrict a search space for this query to the first corpus of data corresponding to the user manual corpus of data that is specific to the vehicle in obtaining responsive content that is responsive to the query. Absent this temporal relationship between the spoken utterance and the corresponding vehicle sensor data instance, the system may search not only the user manual corpus of data that is specific to the vehicle, but also search one or more other corpora of data that are not specific to the vehicle in obtaining responsive content that is responsive to the query. Put another way, the system can utilize this temporal relationship between the spoken utterance and the corresponding vehicle sensor data instance to infer that the user provided the spoken utterance to inquire further about the light on the dashboard being illuminated and/or the alert being displayed.

In additional or alternative implementations, the system may make this determination based on determining whether the spoken utterance that includes the query is related to corresponding vehicle sensor data instance. For example, again assume the corresponding vehicle sensor data instance corresponds to the tire pressure data instance that indicates the front passenger tire is low on air, the light on the dashboard of the vehicle is illuminated and/or the alert being displayed, and that the spoken utterance of "What's under pressure?" is received by the system. As noted above, the system can process, using the ASR model, the audio data capturing the spoken utterance that includes the query to generate one or more recognized terms corresponding to the query. This enables the system to determine that the recognized terms "under pressure" relate to the front passenger tire being low on air in view of the light on the dashboard of the vehicle being illuminated and/or the alert being displayed based on the corresponding vehicle sensor data instance. In doing so, the system can utilize various word matching techniques to determine that the alert and the query are related (e.g., soft word matching, semantic word matching, and/or other techniques). Accordingly, the system may restrict a search space for this query to the first corpus of data corresponding to the user manual corpus of data that is specific to the vehicle in obtaining responsive content that is responsive to the query. Absent this linguistic relationship between the terms of the query and the corresponding vehicle sensor data instance, the system may search not only the user manual corpus of data that is specific to the vehicle, but also search one or more other corpora of data that are not specific to the vehicle in obtaining responsive content that is responsive to the query. Put another way, the system can additionally, or alternatively, utilize this linguistic relationship between the spoken utterance and the corresponding vehicle sensor data instance to infer that the user provided the spoken utterance to inquire further about the light on the dashboard being illuminated and/or the alert being displayed.

In additional or alternative implementations, the system may make this determination based on determining whether the user that provided the spoken utterance has been associated with the vehicle for a threshold duration of time. The threshold duration of time may indicate, for instance, a time that the user has spent inside the vehicle, a quantity of miles that the user has driven the vehicle, a quantity of times that the user has started the vehicle, a quantity of times that a given corresponding vehicle sensor data instance generated by one or more of the sensors of the vehicle has been obtained, and/or other factors. For example, in processing the audio data capturing the spoken utterance that includes the query, the system can perform speaker identification on the audio data to determine whether the user that provided the spoken utterance is a known user. The system can perform the speaker identification using any known technique (e.g., text-dependent speaker identification, text-independent speaker identification, etc.) and using any known speaker identification model. The system can additionally, or alternatively, utilize other techniques to determine whether the user that provided the spoken utterance is a known user, such as face identification based on processing vision data generated by vision sensor(s) of the computing device or an additional computing device, fingerprint identification based on processing fingerprint data generated by fingerprint sensor(s) of the computing device or an additional computing device, and/or any other technique.

Further, the system can compare the identification information to identification information of a known user of the vehicle (e.g., an account associated with the vehicle or the automated assistant), and determine whether the user is a known user. In these implementations, if the user is a known user, but has not been associated with the vehicle for the threshold duration of time, then the system may restrict a search space for this query to the first corpus of data corresponding to the user manual corpus of data that is specific to the vehicle in obtaining responsive content that is responsive to the query. Additionally, or alternatively, if the user is not a known user, then the system may also restrict a search space for this query to the first corpus of data corresponding to the user manual corpus of data that is specific to the vehicle in obtaining responsive content that is responsive to the query. Put another way, the system can additionally, or alternatively, restrict the search space to the user manual corpus of data based on the user that provided the spoken utterance being a new owner of the vehicle (or borrower of the vehicle) that may not be familiar with what caused the dashboard of the vehicle to be illuminated and/or the alert to be displayed. However, in these implementations, if the user is a known user and has been associated with the vehicle for the threshold duration of time, the system may not restrict the search space for this query to the first corpus of data corresponding to the user manual corpus of data that is specific to the vehicle in obtaining responsive content that is responsive to the query since the user is likely already familiar with what caused the dashboard of the vehicle to be illuminated and/or the alert to be displayed.

In additional or alternative implementations, the system may make this determination based on determining whether the spoken utterance includes an explicit indication to only search the first corpus of data. For example, again assume the corresponding vehicle sensor data instance corresponds to the tire pressure data instance that indicates the front passenger tire is low on air, and assume the light on the dashboard of the vehicle is illuminated and/or the alert is displayed. However, assume that the spoken utterance of "Check my user manual to see what's under pressure" is received by the system. In this example, the query included in the spoken utterance also includes an explicit indication to only search the first corpus of data as indicated by "my user manual".

In additional or alternative implementations, the system may make this determination based on whether the spoken utterance was received while the user is located in the vehicle. For example, assume that the spoken utterance of "What's under pressure" is received by the system while the user is located in the vehicle. In this example, and even if the system determines to execute both the first search over the first corpus of data and the second search over the second corpus of data (e.g., as described with respect to implementations of FIG. 4), the system can bias selection of the given candidate response towards one or more of the candidate responses obtained from the first corpus of data based on the spoken utterance being received while the user is located in the vehicle.

In additional or alternative implementations, the system may make this determination based on whether the spoken utterance includes one or more terms that are determined to correspond to one or more salient terms. For example, assume that the spoken utterance of "What's preconditioning" is received by the system while the user is in the vehicle. In this example, the NLU output generated based on processing the spoken utterance may include the term "preconditioning". Further, the system can cross-reference the term "preconditioning" with one or more salient terms of the user manual corpus of data and determine that "preconditioning" is a salient term relevant to one or more documents in the first corpus of data (e.g., using various word matching techniques). As a result, the system may execute a first search over the first corpus of data, but not the second corpus of data (e.g., as described with respect to FIG. 3). Additionally, or alternatively, the system can execute the second search over the second corpus of data (e.g., as described with respect to implementations of FIG. 4), but bias selection of the given candidate response towards one or more of the candidate responses obtained from the first corpus of data based on the spoken utterance including one or more salient terms from the user manual corpus of data.

If, at an iteration of block 356, the system determines to execute a first search over a first corpus of data, but not a second search over a second corpus of data, then the system proceeds to block 358. At block 358, the system causes a first search over a first corpus of data to be executed to identify one or more candidate responses for the query. At block 360, the system refrains from causing a second search over a second corpus of data to be executed to identify one or more of the candidate responses for the query. Put another way, the system can generate the first search to be submitted over the first corpus of data based on the NLU data for the query and an indication of the corresponding vehicle sensor data instance, but refrain from generating any second search to be submitted over the second corpus of data. For example, again assume that the spoken utterance of "What's under pressure?" is received by the system, and assume that the system determines to restrict the search space to only the user manual corpus of data. In this example, the system can generate a structured request to search the user manual corpus of data based on the terms "under pressure" and an indication that the tire pressure data instance indicates the front passenger tire is low on air. In response, one or more candidate responses can be identified based on one or more content items included in the user manual corpus of data, such as what the tire pressure should be, what tire pressure causes the light on the dashboard of the vehicle to be illuminated and/or the alert to be displayed, and/or any other content items included in the user manual corpus of data that is obtained responsive to the first search. In this example, the search may be further limited to a "tire" section of the user manual corpus of data.

If, at an iteration of block 356, the system determines to execute a first search over a first corpus of data, and a second search over a second corpus of data, then the system proceeds to block 362. At block 362, the system causes a first search over a first corpus of data to be executed to identify one or more candidate responses for the query. At block 364, the system causes a second search over a second corpus of data to be executed to identify one or more of the candidate responses for the query. Put another way, the system can generate the first search to be submitted over the first corpus of data based on the NLU data for the query and the corresponding vehicle sensor data instance, and also generate at least a second search to be submitted over the second corpus of data based on the query. For example, the system causes the first search over the first corpus of data to be executed to identify one or more candidate responses for the query in the same or similar manner described above with respect to the operations of block 358 and with respect to the user manual corpus of data. Further, the system also causes the second search over the second corpus of data to be executed to identify one or more of the candidate responses for the query, such as a query to be submitted to a search engine and/or one or more applications. For instance, the query can be submitted to a media application to obtain responsive content corresponding to the song "Under Pressure" by the band Queen.

At block 366, the system causes a given candidate response, from among the one or more candidate responses, to be provided for presentation to the user via the computing device or an additional computing device. In some implementations, the one or more candidate responses may only include candidate responses based on the first corpus of data (e.g., in implementations where the system arrives at block 366 from block 360). In other implementations, the one or more candidate responses may include candidate responses based on the first corpus of data and the second corpus of data (e.g., in implementations where the system arrives at block 366 from block 364). In some implementations, the system can select the given candidate response, from among the one or more candidate responses based on a ranking of the one or more candidate responses. The system can rank the one or more candidate responses based on one or more ranking criteria. The one or more ranking criteria can include, for example, one or more terms of the query, the corresponding vehicle sensor data instance, one or more user contextual signals that characterize a state of the user of the vehicle, one or more vehicle contextual signals that characterize a state of vehicle, application data associated with one or more applications accessible at the computing device or the additional computing device, and/or other criteria. Further, the system can select the given candidate response based on the ranking, and cause the given candidate response to be provided for audible and/or visual presentation to the user via the computing device or the additional computing device.

Figure 4:
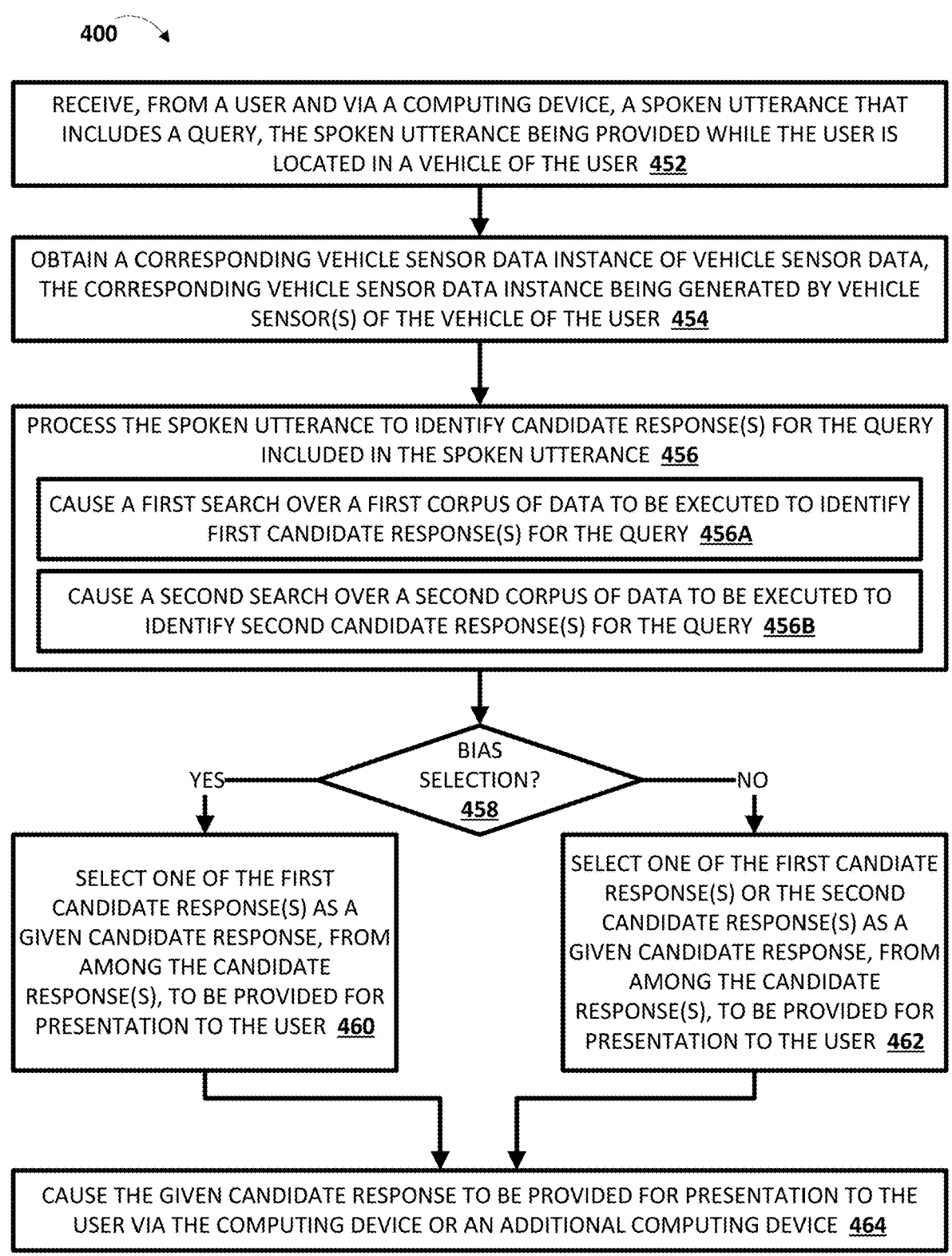
FIG. 4 depicts a flowchart illustrating another example method of biasing interpretations of spoken utterance(s) that are received in a vehicular environment, in accordance with various implementations.

Turning now to FIG. 4, a flowchart illustrating another example method 400 of biasing interpretations of spoken utterance(s) that are received in a vehicular environment is depicted. For convenience, the operations of the method 400 are described with reference to a system that performs the operations. This system of the method 400 includes at least one processor, at least one memory, and/or other component(s) of computing device(s) (e.g., computing device(s) 110$_{1-N}$ of FIG. 1, biasing system 120 of FIG. 1, computing device 710 of FIG. 7, remote server(s), and/or other computing devices). While operations of the method 400 are shown in a particular order, this is not meant to be limiting. One or more operations may be reordered, omitted, and/or added.

At block 452, the system receives, from a user and via a computing device, a spoken utterance that includes a query, the spoken utterance being provided while the user is located in a vehicle of the user. At block 454, the system obtains a corresponding vehicle sensor data instance of vehicle sensor data, the corresponding vehicle sensor data instance being generated by one or more vehicle sensors of the vehicle of the user. The operations of blocks 452 and 454 of the method 400 of FIG. 4 can be performed in the same or similar manner described above with respect to the operations of blocks 352 and 354 of the method 300 of FIG. 3, respectively.

At block 456, the system processes the spoken utterance to identify one or more candidate responses for the query included in the spoken utterance. For example, as indicated at block 456A, the system causes a first search over a first corpus of data to be executed to identify one or more first candidate responses for the query. The system can cause the first search over the first corpus of data to be executed to identify the one or more first candidate responses for the query in the same or similar manner described with respect to the operations of blocks 358 and 360 of the method 300 of FIG. 3. Further, as indicated at block 4568, the system causes a second search over a second corpus of data to be executed to identify one or more second candidate responses for the query. The system can cause the second search over the second corpus of data to be executed to identify the one or more second candidate responses for the query in the same or similar manner described with respect to the operations of block 364 of the method 300 of FIG. 3. Notably, and in contrast with the method 300 of FIG. 3, the method 400 of FIG. 4 may not make a determination of whether to restrict the search space prior to causing any of the searches to be executed.

Rather, at block 458, the system determines whether to bias selection of one or more of the candidate responses towards one or more of the first candidate responses identified based on the first search over the first corpus of data. Put another way, the system obtains the one or more first candidate responses for the query based on the first search over the first corpus of data and the one or more second candidate responses for the query based on the second search over the second corpus of data, and then determines whether to bias towards one or more of the first candidate responses based on one or more biasing criteria. The one or more biasing criteria utilized in making this determination are described in more detail herein (e.g., with respect to the operations of block 356 of the method 300 of FIG. 3).

If, at an iteration of block 458, the system determines to bias selection of one or more of the candidate responses towards one or more of the first candidate responses identified based on the first search over the first corpus of data, the system proceeds to block 460. At block 460, the system selects one of the one or more first candidate responses as a given candidate response, from among the one or more candidate responses, to be provided for presentation to the user. In implementations where the one or more first candidate responses include multiple candidate responses, the system can rank the one or more first candidate responses and select, for example, a highest ranked first candidate response as the given candidate response. The system can rank the one or more first candidate responses using various ranking criteria described herein.

If, at an iteration of block 458, the system determines not to bias selection of one or more of the candidate responses towards one or more of the first candidate responses identified based on the first search over the first corpus of data, the system proceeds to block 462. At block 462, the system selects one of the one or more first candidate responses or the one or more second candidate responses as a given candidate response, from among the one or more candidate responses, to be provided for presentation to the user. Similarly, the system can rank the one or more first candidate responses and the one or more second responses and select, for example, a highest ranked one of the one or more first candidate responses and the one or more second candidate responses as the given candidate response. The system can rank the one or more first candidate responses using various ranking criteria described herein.

At block 464, the system causes the given candidate response to be provided for presentation to the user via the computing device or an additional computing device. The system can cause the given candidate responses to be provided for presentation to the user in the same or similar manner described above with respect to the operations of block 366 of the method 300 of FIG. 3.

Figure 5:
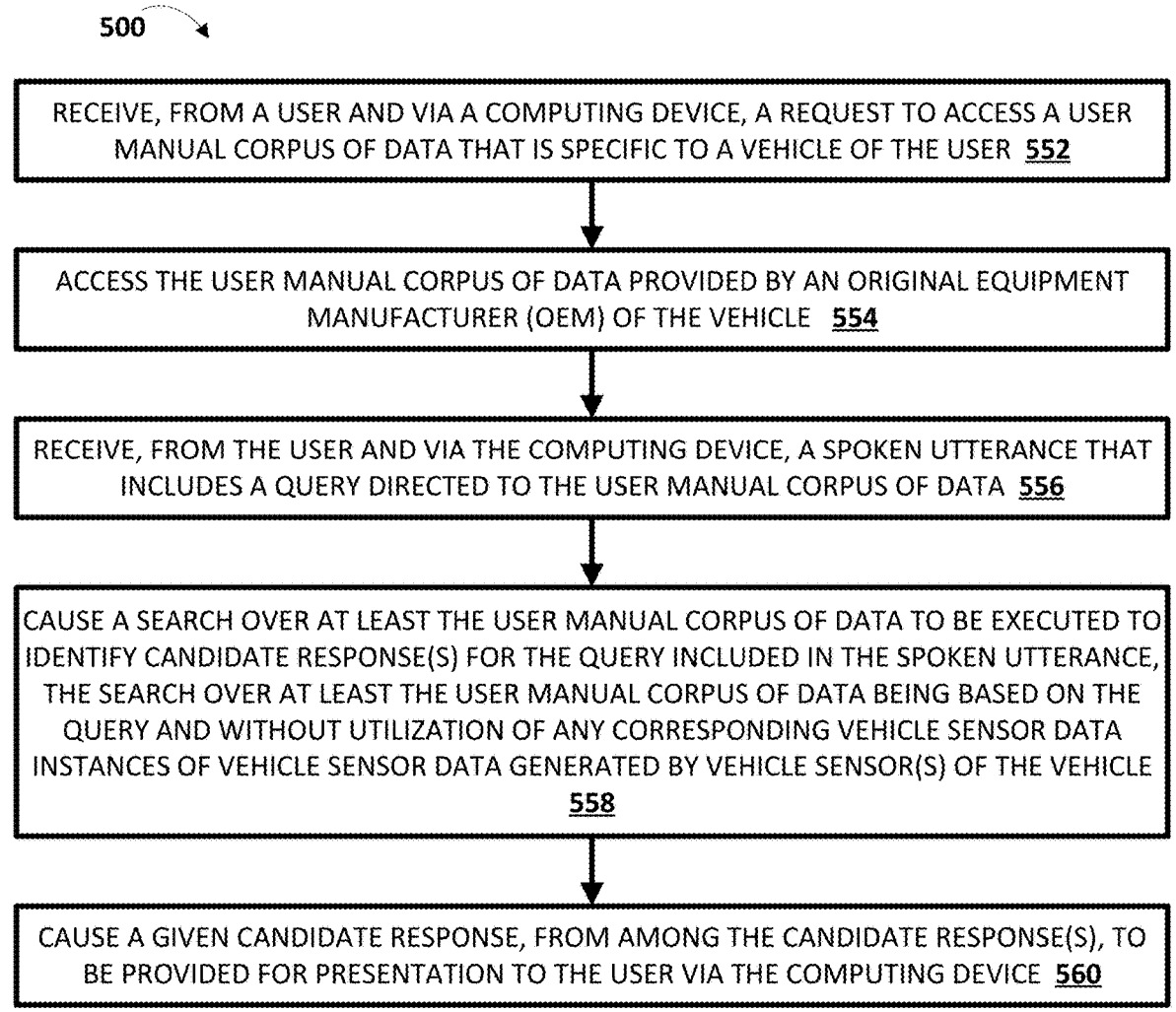
FIG. 5 depicts a flowchart illustrating yet another example method of biasing interpretations of spoken utterance(s) that are received in a vehicular environment, in accordance with various implementations.

Turning now to FIG. 5, a flowchart illustrating another example method 500 of biasing interpretations of spoken utterance(s) that are received in a vehicular environment is depicted. For convenience, the operations of the method 500 are described with reference to a system that performs the operations. This system of the method 500 includes at least one processor, at least one memory, and/or other component(s) of computing device(s) (e.g., computing device(s) 110$_{1-N}$ of FIG. 1, biasing system 120 of FIG. 1, computing device 710 of FIG. 7, remote server(s), and/or other computing devices). While operations of the method 500 are shown in a particular order, this is not meant to be limiting. One or more operations may be reordered, omitted, and/or added.

At block 552, the system receives, from a user and via a computing device, a request to access a user manual corpus of data that is specific to a vehicle of the user. At block 554, the system accesses the user manual corpus of data provided by an original equipment manufacturer (OEM) of the vehicle. The computing device can be, for example, a mobile computing device of the user, and the request can be directed to an automated assistant executing at least in part at the mobile computing device of the user. In some implementations, the request can be included in textual or touch data provided by the user at a display of the computing device. For example, the system can receive the request based on the user providing textual or touch input detected via an interface of an automated assistant application. In other implementations, the request can be included in a spoken utterance that is received in response to the automated assistant being explicitly or implicitly invoked as described with respect to the operations of block 352 of the method 300 of FIG. 3.

For example, the spoken utterance that includes the request can be captured in audio data generated by one or more microphones of the computing device, and optionally in response to an invocation of the automated assistant as noted above. The system can process, using an automatic speech recognition (ASR) model, the audio data capturing the spoken utterance that includes the request to generate ASR data for the request, such as one or more recognized terms corresponding to the request. Further, the system can process, using a natural language understanding (NLU) model, the ASR data for the request(or textual or touch data provided by the user), to generate NLU data for the request, such as intent(s), slot value(s) for parameter(s) associated with the intent(s), and/or other NLU data. Based on the NLU data for the request, the system can determine that the spoken utterance includes the request to access the user manual corpus of data that is specific to the vehicle of the user. Further, the system can generate and transmit a request to a third-party application or agent associated with the OEM of the vehicle. The request can include, for instance, a make and model of the vehicle of the user, a year associated with the make and model of the vehicle of the user, and/or other information that can be utilized in identifying a correct user manual corpus of data for the vehicle of the user. In this example, the system can access this information based on user profile data from a user profile of the user and/or prompt the user to provide this information. Further, the system can access the user manual corpus of data from the third-party application or agent associated with the OEM of the vehicle and responsive to the transmitting of the request.

At block 556, the system receives, from the user and via a computing device, a spoken utterance that includes a query directed to the user manual corpus of data. In some implementations, the spoken utterance may be received in response to the automated assistant being explicitly or implicitly invoked at the computing device as described above with respect to the operations of block 552. Further, the system can process audio data capturing the spoken utterance using at least the ASR model and/or the NLU model to determine that the spoken utterance includes the query directed to the user manual corpus of data. Notably, in various implementations, the request received at block 552 and the spoken utterance received at block 556 may be received from the user as a single request.

At block 558, the system causes a search over at least the user manual corpus of data to be executed to identify one or more candidate responses for the query included in the spoken utterance, the search over at least the user manual corpus of data being based on the query and without utilization of any corresponding vehicle sensor data instances of vehicle sensor data generated by one or more sensors of the vehicle. For example, assume the vehicle of the user is from 1994. In this example, the vehicle is unlikely to have an in-vehicle computing device that is capable of communicating with the system. As a result, the system may not be able to leverage the corresponding sensor data instances in causing the search over the user manual corpus of data to be executed to identify the one or more candidate responses for the query. Nonetheless, the automated assistant executing at the mobile computing device of the user can still access the user manual corpus of data for this vehicle to enable the user to query the user manual corpus of data via the automated assistant.

At block 560, the system causes a given candidate responses, from among the one or more candidate responses, to be provided for presentation to the user via the computing device. In some implementations, the system can select the given candidate response, from among the one or more candidate responses based on a ranking of the one or more candidate responses. The system can rank the one or more candidate responses based on one or more ranking criteria. The one or more ranking criteria can include, for example, one or more terms of the query, the corresponding vehicle sensor data instance, one or more user contextual signals that characterize a state of the user of the vehicle, one or more vehicle contextual signals that characterize a state of vehicle, application data associated with one or more applications accessible at the computing device or the additional computing device, and/or other criteria. Further, the system can select the given candidate response based on the ranking, and cause the given candidate response to be provided for audible and/or visual presentation to the user via the computing device or the additional computing device.

Although the method 500 of FIG. 5 is described with respect to only causing the search over the user manual corpus of data to be executed, it should be understood that is for the sake of example and is not meant to be limiting. For instance, the system can additionally cause an additional search over an additional corpus of data that is not specific to the vehicle to be executed. In these implementations, the given candidate response can additionally be selected from among any other candidate responses determined based on the search over the additional corpus of data.

Figure 6A:
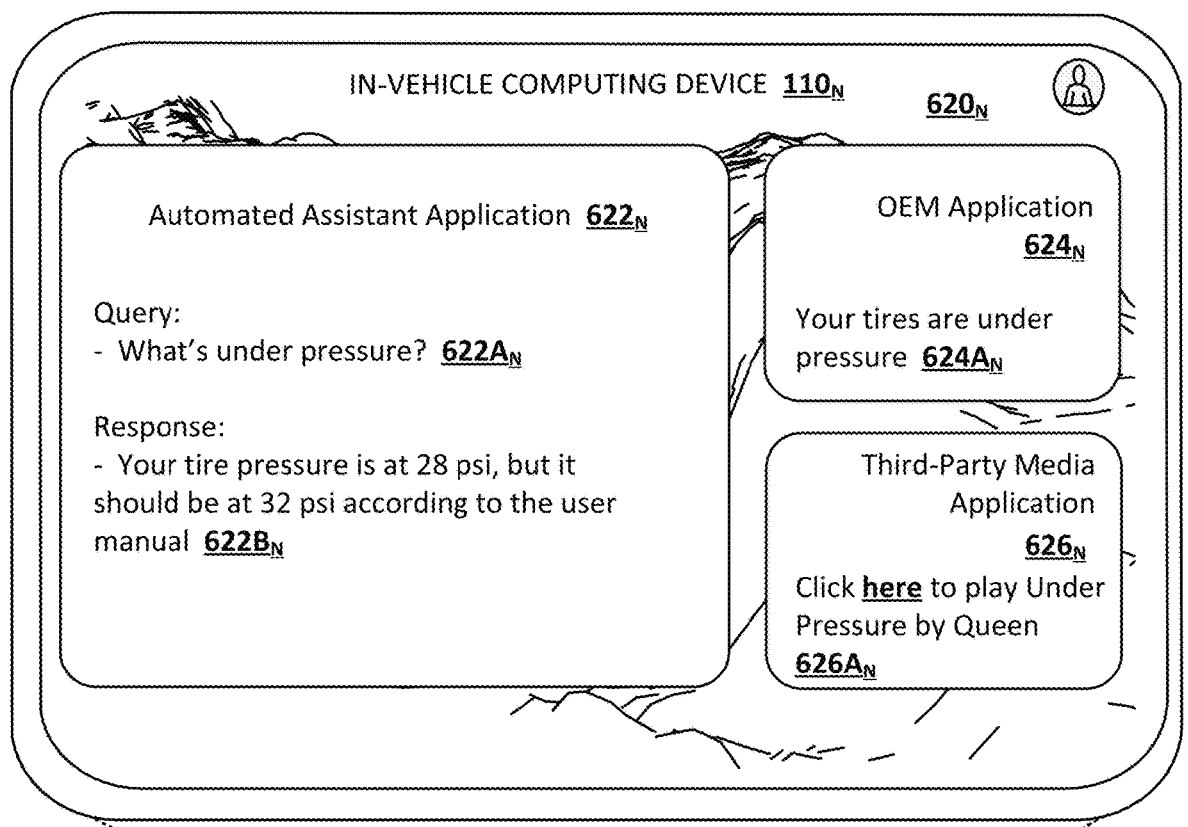
FIGS. 6A and 6B depict various non-limiting examples of computing devices that illustrate various user interactions of biasing speech processing of spoken utterances in a vehicular environment, in accordance with various implementations.
Figure 6A:
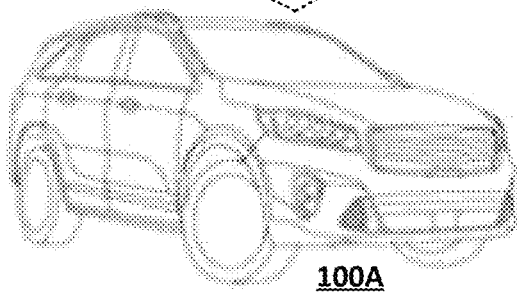
Figure 6B:
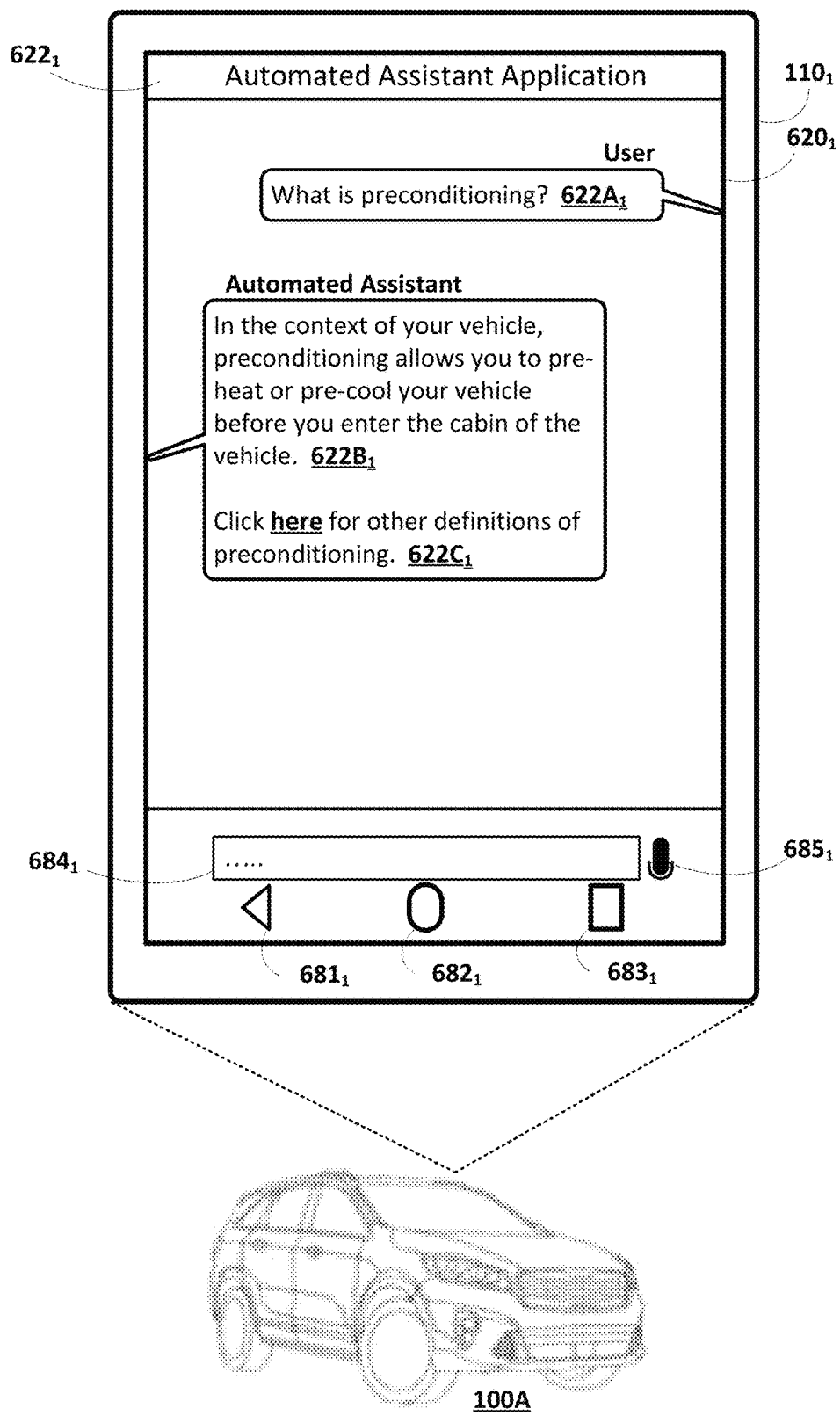

Turning now to FIGS. 6A and 6B, various non-limiting examples of computing devices that illustrate various user interactions of biasing speech processing of spoken utterances in a vehicular environment are depicted. Referring specifically to FIG. 6A, the in-vehicle computing device 110$_N$ from FIG. 1 is depicted. The in-vehicle computing device 110$_N$ includes a display 620$_N$ having a plurality of disparate portions that are dedicated to different applications. For example, the display 620$_N$ of FIG. 6A includes a first portion 622N of the display 620$_N$ that is dedicated to an automated assistant application executing at least in part at the in-vehicle computing device 110$_N$, a second portion 624N of the display 620$_N$ that is dedicated to an OEM application of an OEM of the vehicle 100A executing at least in part at the in-vehicle computing device 110$_N$, and a third portion 626$_N$ of the display 620$_N$ that is dedicated to a third-party media application associated with an example music streaming service. Although the display 620$_N$ of the in-vehicle computing device 110$_N$ is shown in FIG. 6A as having a particular configuration (e.g., multiple disparate portions dedicated to various applications), it should be understood that is for the sake of example and is not meant to be limiting. For instance, the display 620$_N$ may be configured in any desirable manner and specific to unique OEMs.

For the sake of example, assume that a corresponding vehicle sensor data instance corresponding to a tire pressure data instance of tire pressure data is generated by one or more tire sensors of the vehicle 100A and indicates that tire pressure of one or more tires of the vehicle 100A is under pressure. Further assume that the second portion 624N of the display 620$_N$ that is dedicated to the OEM application displays, based on the tire pressure data instance, an alert 624A$_N$ of "Your tires are under pressure" for presentation to the user. Further assume that the user of the vehicle 100A invoked the automated assistant and provides a spoken utterance that includes a query 622A$_N$ of "What's under pressure". In this example, audio data capturing the spoken utterance can be processed to determine that the spoken utterance includes the query 622A$_N$.

Moreover, using various biasing techniques described herein (e.g., with respect to FIGS. 3 and 4), the automated assistant can determine that, in providing the query 622A$_N$, the user is requesting clarification with respect to the alert 624A$_N$. Notably, the automated assistant can determine that the user is requesting clarification with respect to the alert 624A$_N$, rather than submitting a general query, based on, for example, a temporal relationship between the query 622A$_N$ and the alert 624A$_N$ (e.g., based on the query 622A$_N$ being received within a threshold duration of time that the alert 624A$_N$ is provided for presentation to the user), a linguistic relationship between the query 622A$_N$ and the alert 624A$_N$ (e.g., based on the query 622A$_N$ and the alert 624A$_N$ both including the terms "under pressure"), a temporal relationship between the user and the vehicle 100A (e.g., based on how long the user has owned the vehicle 100A, based on how many miles the user has driven the vehicle 100A, based on how many times the user has started the vehicle, etc.), and/or other biasing criteria.

Accordingly, in the example of FIG. 6A, the automated assistant can restrict a search space for identifying one or more candidate responses to the query 622A$_N$ to a user manual corpus of data as described with respect to FIG. 3. Further, a given candidate response 622B$_N$ of "Your tire pressure is at 28 psi, but it should be 32 psi according to the user manual" can be provided for presentation to the user visually as shown in FIG. 6A and/or audibly. Additionally, or alternatively, in the example of FIG. 6A, the automated assistant can search both the user manual corpus of data and additional corpora of data (e.g., the Internet, other applications, other databases, etc.) for identifying one or more candidate responses to the query 622A$_N$, but bias selection of the given candidate response 622B$_N$ to one or more candidate answers obtained using the user manual corpus of data as described with respect to FIG. 4. In these additional or alternative examples, the automated assistant can also identify other candidate responses that may be relevant to the query 622A$_N$, but that are determined to not be responsive to the 622A$_N$. For example, in various implementations, the automated assistant can additionally cause a notification 626A$_N$ of "Click here to play Under Pressure by Queen" to be provided for presentation to the user via the third portion $626_N$ of the display $620_N$ that is dedicated to the third-party media application.

Referring specifically to FIG. 6B, the computing device $110_1$ from FIG. 1 is depicted. The computing device $110_1$ is depicted as a mobile computing device of the user of the vehicle 100A, but it should be understood that is for the sake of example and is not meant to be liming. The computing device $110_1$ includes a display $620_1$ having various system interface elements $681_1$, $682_1$, and $683_1$ (e.g., hardware and/or software interface elements) that may be interacted with by the user to cause the computing device $110_1$ to perform one or more actions. The display $620_1$ of the computing device $110_1$ enables the user to interact with content rendered on the display $620_1$ by typed or touch input (e.g., by directing user input to the display $620_1$ or textual interface element $684_1$) and/or by spoken input (e.g., by selecting microphone interface element $685_1$— or just by speaking without necessarily selecting the microphone interface element $685_1$ (i.e., the automated assistant may monitor for one or more terms or phrases, gesture(s) gaze(s), mouth movement(s), lip movement(s), and/or other conditions to activate spoken input) at the computing device $110_1$). Moreover, an automated assistant application can be implemented at least in part at the computing device $110_1$ as indicated by $622_1$.

For the sake of example, assume that the user of the vehicle 100A has already provided a request for the automated assistant to access a user manual corpus of data associated with the vehicle 100A. Further assume that the user provides input $622A_1$ (e.g., via a spoken utterance or typed input) of "What is preconditioning?". In this example, the automated assistant can cause a search to be executed over the user manual corpus of data provided by the OEM of the vehicle to identify a given candidate response $622B_1$ of "In the context of your vehicle, preconditioning allows you to pre-heat or pre-cool your vehicle before you enter the cabin of the vehicle" and even without utilization of any vehicle sensor data instances of vehicle sensor data. Absent the techniques described herein, the automated assistant may not return any definition within the context of the vehicle 100A. Nonetheless, these other definitions of "preconditioning" may be made available to the user as indicated by a notification $622C_1$ of "Click here for other definitions of preconditioning". Notably, implementations of the example of FIG. 6B are particularly advantageous in scenarios where there is no in-vehicle computing device as described with respect to FIG. 6A and/or the in-vehicle computing device $110_N$ is not able to execute an automated assistant. Although FIGS. 6A and 6B are described with respect to particular examples, it should be understood that is not meant to be limiting.

Figure 7:
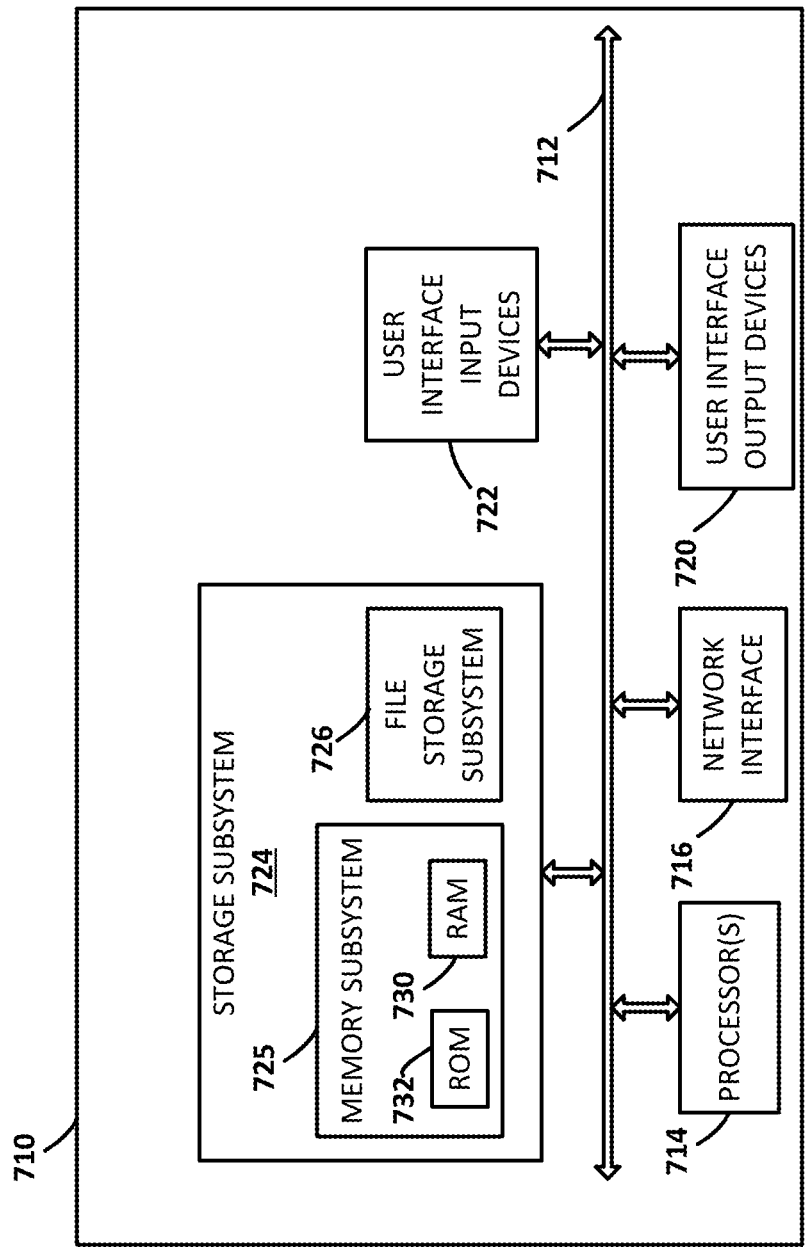
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more computing devices, one or more vehicles, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a user and via a computing device, a spoken utterance that includes a query, the spoken utterance being provided while the user is located in a vehicle of the user; obtaining a corresponding vehicle sensor data instance of vehicle sensor data, the corresponding vehicle sensor data instance being generated by one or more vehicle sensors of the vehicle of the user; determining, based on (i) the query and/or (ii) the corresponding vehicle sensor data instance, whether to execute a first search over a first corpus of data and/or a second search over a second corpus of data to identify one or more candidate responses for the query included in the spoken utterance; in response to determining to execute the first search over the first corpus of data, but to refrain from executing the second search over the second corpus of data: causing the first search over the first corpus of data to be executed to identify the one or more candidate responses for the query included in the spoken utterance, the first search being based on (i) the query and (ii) the corresponding vehicle sensor data instance; and causing a given candidate response, from among the one or more candidate responses, to be provided for presentation to the user via the computing device or an additional computing device.

These and other implementations of technology disclosed herein can optionally include one or more of the following features.

In some implementations, the method may further include processing, using an automatic speech recognition (ASR) model, audio data capturing the spoken utterance that includes the query to generate ASR data for the query; and processing, using a natural language understanding (NLU) model, the ASR data to generate NLU data for the query. In some versions of those implementations, causing the first search over the first corpus of data to be executed to identify the one or more candidate responses for the query included in the spoken utterance may include causing the NLU data for the query and an indication of the corresponding vehicle sensor data instance to be submitted to the first corpus of data to execute the first search over the first corpus of data; and identifying, based on content that is response to the NLU data for the query, the one or more candidate responses.

In some implementations, the first corpus of data may correspond to a user manual corpus of data that is specific to the vehicle and that is provided by an original equipment manufacturer (OEM) of the vehicle, and the second corpus of data may correspond to an additional corpus of data that is not specific to the vehicle.

In some implementations, determining to execute the first search over the first corpus of data, but to refrain from executing the second search over the second corpus of data may include identifying a corresponding timestamp associated with the corresponding vehicle sensor data instance, the corresponding timestamp associated with the corresponding vehicle sensor data instance corresponding to a time the corresponding vehicle sensor data instance is generated; determining, based on the corresponding timestamp associated with the corresponding vehicle sensor data instance, whether the spoken utterance that includes the query was received within a threshold duration of time with respect to the time the corresponding vehicle sensor data instance is generated; and in response to determining that the spoken utterance that includes the query was received within the threshold duration of time: determining to execute the first search over the first corpus of data, but to refrain from executing the second search over the second corpus of data. In some versions of those implementations, the method may further include, in response to determining that the spoken utterance that includes the query was received within the threshold duration of time: determining to execute the first search over the first corpus of data and to execute the second search over the second corpus of data. In some further versions of those implementations, the method may further include, in response to determining to execute the first search over the first corpus of data and to executing the second search over the second corpus of data: causing the first search over the first corpus of data to be executed to identify one or more of the candidate responses for the query included in the spoken utterance, the first search being based on (i) the query and (ii) the corresponding vehicle sensor data instance; and causing the second search over the second corpus of data to be executed to identify one or more of the candidate responses for the query included in the spoken utterance, the second corpus of data being in addition to the first corpus of data, and the second search being based on (i) the query, but not (ii) the corresponding vehicle sensor data instance. In yet further versions of those implementations, the method may further include selecting, based on a ranking of the one or more candidate responses, the given candidate response to be provided for presentation to the user via the computing device or an additional computing device. In even yet further versions of those implementations, the ranking of the one or more candidate responses is based on one or more of: one or more terms of the query; the corresponding vehicle sensor data instance; one or more user contextual signals that characterize a state of the user of the vehicle; one or more vehicle contextual signals that characterize a state of vehicle; or application data associated with one or more applications accessible at the computing device or the additional computing device.

In some implementations, determining to execute the first search over the first corpus of data, but to refrain from executing the second search over the second corpus of data may include determining that one or more terms of the query included in the spoken utterance are related to the corresponding vehicle sensor data instance. In some versions of those implementations, the corresponding vehicle sensor data instance, when generated, may cause the computing device or the additional computing device to provide, for presentation to the user, an indication of the corresponding vehicle sensor data instance. In some further versions of those implementations, determining that one or more of the terms of the query included in the spoken utterance are related to the corresponding vehicle sensor data instance may include determining that one or more terms of the query included in the spoken utterance are directed to the indication of the corresponding vehicle sensor data instance provided for presentation to the user via the computing device or the additional computing device.

In some implementations, the method may further include identifying, based on processing the spoken utterance that includes the query, a duration of time that the user has been associated with the vehicle. Identifying the duration of time that the user has been associated with the vehicle may include causing speaker identification to be performed based on processing the spoken utterance to determine whether the user is a known user; and in response to determining that the user is a known user: identifying the duration of time that the user has been associated with the vehicle based on a user profile associated with the user. In some versions of those implementations, determining to execute the first search over the first corpus of data, but to refrain from executing the second search over the second corpus of data may include determining whether the duration of time that the user has been associated with the vehicle satisfies a threshold duration of time; and in response to determining that the duration of time that the user has been associated with the vehicle fails to satisfy the threshold duration of time: determining to execute the first search over the first corpus of data, but to refrain from executing the second search over the second corpus of data. In yet further versions of those implementations, the method may further include, in response to determining that the duration of time that the user has been associated with the vehicle satisfies the threshold duration of time: causing, based on (i) the query and (ii) the corresponding vehicle sensor data instance, the first search over the first corpus of data to be executed to identify one or more of the candidate responses for the query included in the spoken utterance; and causing, based on (i) the query, the second search over the second corpus of data to be executed to identify one or more of the candidate responses for the query included in the spoken utterance, the second corpus of data being in addition to the first corpus of data. In even yet further versions of those implementations, the method may further include selecting, based on a ranking of the one or more candidate responses, the given candidate response to be provided for presentation to the user via the computing device or an additional computing device.

In some implementations, a method implemented by one or more processors is provided, and includes receiving, from a user and via a computing device, a spoken utterance that includes a query, the spoken utterance being provided while the user is located in a vehicle of the user; obtaining a corresponding vehicle sensor data instance of vehicle sensor data, the corresponding vehicle sensor data instance being generated by one or more vehicle sensors of the vehicle of the user; and processing the spoken utterance to identify a plurality of candidate responses for the query included in the spoken utterance. Processing the spoken utterance to identify the plurality of candidate responses for the query included in the spoken utterance includes causing a first search over a first corpus of data to be executed identify one or more first candidate responses, of the plurality of candidate responses, for the query included in the spoken utterance, the first search being based on (i) the query and (ii) the corresponding vehicle sensor data instance; and causing a second search over a second corpus of data to be executed to identify one or more second candidate responses, of the plurality of candidate responses, for the query included in the spoken utterance, the second corpus of data being in addition to the first corpus of data, the second search being based on (i) the query, but not (ii) the corresponding vehicle sensor data instance. The method further includes selecting a given candidate response from among the plurality of candidate responses; and causing the given candidate response to be provided for presentation to the user via the computing device or an additional computing device.

These and other implementations of technology disclosed herein can optionally include one or more of the following features.

In some implementations, the method may further include processing, using an automatic speech recognition (ASR) model, audio data capturing the spoken utterance that includes the query to generate ASR data for the query; and processing, using a natural language understanding (NLU) model, the ASR data to generate NLU data for the query. In some versions of those implementations, executing the first search over the first corpus of data to identify the one or more first candidate responses for the query included in the spoken utterance may include causing the NLU data for the query and an indication of the corresponding vehicle sensor data instance to be submitted to the first corpus of data to execute the first search over the first corpus of data; and identifying, based on first content that is response to the NLU data for the query, the one or more first candidate responses.

In some further versions of those implementations, executing the second search over the second corpus of data to identify the one or more second candidate responses for the query included in the spoken utterance may include causing the NLU data for the query to be submitted to the second corpus of data to execute the second search over the second corpus of data; and identifying, based on second content that is response to the NLU data for the query, the one or more second candidate responses.

In additional or alternative further versions of those implementations, the first corpus of data may correspond to a user manual corpus of data that is specific to the vehicle and that is provided by an original equipment manufacturer (OEM) of the vehicle, and the second corpus of data may correspond to a web-based corpus of data that is not specific to the vehicle.

In additional or alternative further versions of those implementations, selecting the given candidate response from among the plurality of candidate responses may include ranking the plurality of candidate responses; biasing the ranking of the plurality of candidate responses towards the one or more first candidate responses; and selecting, the biased ranking of the plurality of candidate responses, the given candidate response from among the plurality of candidate responses. In yet further versions of those implementations, the ranking of the plurality of candidate responses is based on one or more of: one or more terms of the query; the corresponding vehicle sensor data instance; one or more user contextual signals that characterize a state of the user of the vehicle; one or more vehicle contextual signals that characterize a state of vehicle; or application data associated with one or more applications accessible at the computing device or the additional computing device.

In some implementations, a method implemented by one or more processors is provided, and includes receiving, from a user and via a computing device, a spoken utterance that includes a query, the spoken utterance being received while the user is located in a vehicle of the user; obtaining a corresponding vehicle sensor data instance of vehicle sensor data, the corresponding vehicle sensor data instance being generated by one or more vehicle sensors of the vehicle of the user; identifying, based on processing the spoken utterance that includes the query, a duration of time that the user has been associated with the vehicle; determining, based on (i) the query, (ii) the corresponding vehicle sensor data instance, and/or (iii) the duration of time that the user has been associated with the vehicle failing to satisfy a temporal threshold, whether to execute a first search over a first corpus of data and/or a second search over a second corpus of data to identify one or more candidate responses for the query included in the spoken utterance; in response to determining to execute the first search over the first corpus of data, but to refrain from executing the second search over the second corpus of data: causing, based on (i) the query and (ii) the corresponding vehicle sensor data instance, the first search over the first corpus of data to be executed to identify the one or more candidate responses for the query included in the spoken utterance; and causing a given candidate response, from among the one or more candidate responses, to be provided for presentation to the user via the computing device or an additional computing device.

In some implementations, a method implemented by one or more processors is provided, and includes receiving, from a user and via a computing device, a spoken utterance that includes a query, the spoken utterance being provided while the user is located in a vehicle of the user; obtaining a corresponding vehicle sensor data instance of vehicle sensor data, the corresponding vehicle sensor data instance being generated by one or more vehicle sensors of the vehicle of the user; identifying a corresponding timestamp associated with the corresponding vehicle sensor data instance, the corresponding timestamp associated with the corresponding vehicle sensor data instance corresponding to a time the corresponding vehicle sensor data instance is generated; determining, based on (i) the query, (ii) the corresponding vehicle sensor data instance, and/or (iii) the corresponding timestamp associated with the corresponding vehicle sensor data instance, whether to execute a first search over a first corpus of data and/or a second search over a second corpus of data to identify one or more candidate responses for the query included in the spoken utterance; in response to determining to execute the first search over the first corpus of data, but to refrain from executing the second search over the second corpus of data: causing, based on (i) the query and/or (ii) the corresponding vehicle sensor data instance, the first search over the first corpus of data to be executed to identify the one or more candidate responses for the query included in the spoken utterance; and causing a given candidate response, from among the one or more candidate responses, to be provided for presentation to the user via the computing device or an additional computing device.

In some implementations, a method implemented by one or more processors is provided, and includes receiving, from a user and via a computing device, a request to access a user manual corpus of data that is specific to a vehicle of the user; in response to receiving the request to access the user manual corpus of data that is specific to the vehicle, accessing the user manual corpus of data from an original equipment manufacturer (OEM) of the vehicle; receiving, from the user and via the computing device, a spoken utterance that includes a query directed to the user manual corpus of data; causing a search over the user manual corpus of data to be executed identify one or more candidate responses for the query included in the spoken utterance, the search over the user manual corpus of data being based on (i) the query and (ii) without utilization of any corresponding vehicle sensor data instances of vehicle sensor data generated by one or more vehicle sensors of the vehicle; and causing a given candidate response, from among the one or more candidate responses, to be provided for presentation to the user via the computing device or an additional computing device.

In some implementations, a method implemented by one or more processors is provided, and includes receiving, from a user and via a computing device, a spoken utterance that includes a query, the spoken utterance being provided while the user is located in a vehicle of the user; obtaining a corresponding vehicle sensor data instance of vehicle sensor data, the corresponding vehicle sensor data instance being generated by one or more vehicle sensors of the vehicle of the user; and processing the spoken utterance to identify a plurality of candidate responses for the query included in the spoken utterance. Processing the spoken utterance to identify the plurality of candidate responses for the query included in the spoken utterance includes causing a first search over a first corpus of data to be executed identify one or more first candidate responses, of the plurality of candidate responses, for the query included in the spoken utterance, the first search being based on at least (i) the query; and causing a second search over a second corpus of data to be executed to identify one or more second candidate responses, of the plurality of candidate responses, for the query included in the spoken utterance, the second corpus of data being in addition to the first corpus of data, the second search being based on (i) the query. The method further includes selecting, based on (ii) the corresponding vehicle sensor data instance, a given candidate response, from among the plurality of candidate responses, the selecting being biased towards the one or more first candidate responses based on (ii) the corresponding vehicle sensor data instance; and causing the given candidate response to be provided for presentation to the user via the computing device or an additional computing device.

In addition, some implementations include one or more processors (e.g., central processing unit(s) (CPU(s)), graphics processing unit(s) (GPU(s), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors comprising:
receiving, from a user and via a computing device, a spoken utterance that includes a query, the spoken utterance being provided while the user is located in a vehicle of the user;
obtaining a corresponding vehicle sensor data instance of vehicle sensor data, the corresponding vehicle sensor data instance being generated by one or more vehicle sensors of the vehicle of the user;
determining, based on (i) the query and (ii) the corresponding vehicle sensor data instance, whether to execute a first search over a first corpus of data and/or a second search over a second corpus of data to identify one or more candidate responses for the query included in the spoken utterance, wherein the first corpus of data corresponds to a user manual corpus of data that is specific to the vehicle and that is provided by an original equipment manufacturer (OEM) of the vehicle, wherein the second corpus of data corresponds to an additional corpus of data that is not specific to the vehicle, and wherein determining whether to execute a first search over a first corpus of data and/or a second search over a second corpus of data to identify one or more candidate responses for the query included in the spoken utterance comprises:

identifying a corresponding timestamp associated with the corresponding vehicle sensor data instance, the corresponding timestamp associated with the corresponding vehicle sensor data instance corresponding to a time the corresponding vehicle sensor data instance is generated;

determining, based on the corresponding timestamp associated with the corresponding vehicle sensor data instance, whether the spoken utterance that includes the query was received within a threshold duration of time with respect to the time the corresponding vehicle sensor data instance is generated; and in response to determining that the spoken utterance that includes the query was received within the threshold duration of time:

determining to execute the first search over the first corpus of data, but to refrain from executing the second search over the second corpus of data;

in response to determining to execute the first search over the first corpus of data, but to refrain from executing the second search over the second corpus of data:

causing the first search over the first corpus of data to be executed to identify the one or more candidate responses for the query included in the spoken utterance, the first search being based on (i) the query and (ii) the corresponding vehicle sensor data instance; and causing a given candidate response, from among the one or more candidate responses, to be provided for presentation to the user via the computing device or an additional computing device.

2. The method of claim 1, further comprising:

processing, using an automatic speech recognition (ASR) model, audio data capturing the spoken utterance that includes the query to generate ASR data for the query; and processing, using a natural language understanding (NLU) model, the ASR data to generate NLU data for the query.

3. The method of claim 2, wherein causing the first search over the first corpus of data to be executed to identify the one or more candidate responses for the query included in the spoken utterance comprises:

causing the NLU data for the query and an indication of the corresponding vehicle sensor data instance to be submitted to the first corpus of data to execute the first search over the first corpus of data; and identifying, based on content that is response to the NLU data for the query, the one or more candidate responses.

4. The method of claim 1, further comprising:

in response to determining that the spoken utterance that includes the query was not received within the threshold duration of time:

determining to execute the first search over the first corpus of data and to execute the second search over the second corpus of data.

5. The method of claim 4, further comprising:

in response to determining to execute the first search over the first corpus of data and to executing the second search over the second corpus of data:

causing the first search over the first corpus of data to be executed to identify one or more of the candidate responses for the query included in the spoken utterance, the first search being based on (i) the query and (ii) the corresponding vehicle sensor data instance; and causing the second search over the second corpus of data to be executed to identify one or more of the candidate responses for the query included in the spoken utterance, the second corpus of data being in addition to the first corpus of data, and the second search being based on (i) the query, but not (ii) the corresponding vehicle sensor data instance.

6. The method of claim 5, further comprising:

selecting, based on a ranking of the one or more candidate responses, the given candidate response to be provided for presentation to the user via the computing device or an additional computing device.

7. The method of claim 6, wherein the ranking of the one or more candidate responses is based on one or more of:

one or more terms of the query;

the corresponding vehicle sensor data instance;

one or more user contextual signals that characterize a state of the user of the vehicle;

one or more vehicle contextual signals that characterize a state of vehicle; or application data associated with one or more applications accessible at the computing device or the additional computing device.

8. The method of claim 1, wherein determining to execute the first search over the first corpus of data, but to refrain from executing the second search over the second corpus of data is further based on one or more terms of the query included in the spoken utterance being related to the corresponding vehicle sensor data instance.

9. The method of claim 8, wherein the corresponding vehicle sensor data instance, when generated, causes the computing device or the additional computing device to provide, for presentation to the user, an indication of the corresponding vehicle sensor data instance.

10. The method of claim 9, further comprising:

determining that one or more terms of the query included in the spoken utterance are related to the corresponding vehicle sensor data instance, wherein determining that one or more of the terms of the query included in the spoken utterance are related to the corresponding vehicle sensor data instance comprises:

determining that one or more terms of the query included in the spoken utterance are directed to the indication of the corresponding vehicle sensor data instance provided for presentation to the user via the computing device or the additional computing device.

11. The method of claim 1, further comprising:

identifying, based on processing the spoken utterance that includes the query, a duration of time that the user has been associated with the vehicle, wherein identifying the duration of time that the user has been associated with the vehicle comprises:

causing speaker identification to be performed based on processing the spoken utterance to determine whether the user is a known user; and
in response to determining that the user is a known user:
identifying the duration of time that the user has been associated with the vehicle based on a user profile associated with the user.

12. The method of claim 11, wherein determining to execute the first search over the first corpus of data, but to refrain from executing the second search over the second corpus of data further comprises:
determining whether the duration of time that the user has been associated with the vehicle satisfies a threshold duration of time; and
in response to determining that the duration of time that the user has been associated with the vehicle fails to satisfy the threshold duration of time:
determining to execute the first search over the first corpus of data, but to refrain from executing the second search over the second corpus of data.

13. The method of claim 12, further comprising:
in response to determining that the duration of time that the user has been associated with the vehicle satisfies the threshold duration of time:
causing, based on (i) the query and (ii) the corresponding vehicle sensor data instance, the first search over the first corpus of data to be executed to identify one or more of the candidate responses for the query included in the spoken utterance; and
causing, based on (i) the query, the second search over the second corpus of data to be executed to identify one or more of the candidate responses for the query included in the spoken utterance, the second corpus of data being in addition to the first corpus of data.

14. The method of claim 13, further comprising:
selecting, based on a ranking of the one or more candidate responses, the given candidate response to be provided for presentation to the user via the computing device or an additional computing device.

15. A system comprising:
at least one processor; and
memory storing instructions that, when executed, cause the at least one processor to be operable to:
receive, from a user and via a computing device, a spoken utterance that includes a query, the spoken utterance being provided while the user is located in a vehicle of the user;
obtain a corresponding vehicle sensor data instance of vehicle sensor data, the corresponding vehicle sensor data instance being generated by one or more vehicle sensors of the vehicle of the user;
determine, based on (i) the query and (ii) the corresponding vehicle sensor data instance, whether to execute a first search over a first corpus of data and/or a second search over a second corpus of data to identify one or more candidate responses for the query included in the spoken utterance, wherein the first corpus of data corresponds to a user manual corpus of data that is specific to the vehicle and that is provided by an original equipment manufacturer (OEM) of the vehicle, wherein the second corpus of data corresponds to an additional corpus of data that is not specific to the vehicle, and wherein, in determining whether to execute a first search over a first corpus of data and/or a second search over a second corpus of data to identify one or more candidate responses for the query included in the spoken utterance, the at least one processor is operable to:
identify a corresponding timestamp associated with the corresponding vehicle sensor data instance, the corresponding timestamp associated with the corresponding vehicle sensor data instance corresponding to a time the corresponding vehicle sensor data instance is generated;
determine, based on the corresponding timestamp associated with the corresponding vehicle sensor data instance, whether the spoken utterance that includes the query was received within a threshold duration of time with respect to the time the corresponding vehicle sensor data instance is generated; and
in response to determining that the spoken utterance that includes the query was received within the threshold duration of time:
determine to execute the first search over the first corpus of data, but to refrain from executing the second search over the second corpus of data;
in response to determining to execute the first search over the first corpus of data, but to refrain from executing the second search over the second corpus of data:
cause the first search over the first corpus of data to be executed to identify the one or more candidate responses for the query included in the spoken utterance, the first search being based on (i) the query and (ii) the corresponding vehicle sensor data instance; and
cause a given candidate response, from among the one or more candidate responses, to be provided for presentation to the user via the computing device or an additional computing device.

16. A non-transitory computer-readable storage medium storing instructions that, when executed, cause at least one processor to perform operations, the operations comprising:
receiving, from a user and via a computing device, a spoken utterance that includes a query, the spoken utterance being provided while the user is located in a vehicle of the user;
obtaining a corresponding vehicle sensor data instance of vehicle sensor data, the corresponding vehicle sensor data instance being generated by one or more vehicle sensors of the vehicle of the user;
determining, based on (i) the query and (ii) the corresponding vehicle sensor data instance, whether to execute a first search over a first corpus of data and/or a second search over a second corpus of data to identify one or more candidate responses for the query included in the spoken utterance, wherein the first corpus of data corresponds to a user manual corpus of data that is specific to the vehicle and that is provided by an original equipment manufacturer (OEM) of the vehicle, wherein the second corpus of data corresponds to an additional corpus of data that is not specific to the vehicle, and wherein determining whether to execute a first search over a first corpus of data and/or a second search over a second corpus of data to identify one or more candidate responses for the query included in the spoken utterance comprises:
identifying a corresponding timestamp associated with the corresponding vehicle sensor data instance, the corresponding timestamp associated with the corresponding vehicle sensor data instance corresponding to a time the corresponding vehicle sensor data instance is generated;

determining, based on the corresponding timestamp associated with the corresponding vehicle sensor data instance, whether the spoken utterance that includes the query was received within a threshold duration of time with respect to the time the corresponding vehicle sensor data instance is generated; and in response to determining that the spoken utterance that includes the query was received within the threshold duration of time:
  determining to execute the first search over the first corpus of data, but to refrain from executing the second search over the second corpus of data;

in response to determining to execute the first search over the first corpus of data, but to refrain from executing the second search over the second corpus of data:
  causing the first search over the first corpus of data to be executed to identify the one or more candidate responses for the query included in the spoken utterance, the first search being based on (i) the query and (ii) the corresponding vehicle sensor data instance; and causing a given candidate response, from among the one or more candidate responses, to be provided for presentation to the user via the computing device or an additional computing device.

\* \* \* \* \*